US006778256B2

(12) United States Patent
Morita

(10) Patent No.: US 6,778,256 B2
(45) Date of Patent: Aug. 17, 2004

(54) IMAGE RECORDING DEVICE HAVING A CONVEYING MECHANISM

(75) Inventor: Naoyuki Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/392,834

(22) Filed: Mar. 21, 2003

(65) Prior Publication Data

US 2003/0179351 A1 Sep. 25, 2003

(30) Foreign Application Priority Data

Mar. 25, 2002 (JP) ....................................... 2002-083482
Feb. 21, 2003 (JP) ....................................... 2003-044301

(51) Int. Cl.[7] ........................ G03B 27/52; G03B 29/00; G03B 27/44

(52) U.S. Cl. .............................. 355/40; 355/29; 355/46

(58) Field of Search .............................. 355/40, 28, 46, 355/29, 41, 50, 27; 396/612, 616; 271/286, 298

(56) References Cited

U.S. PATENT DOCUMENTS 4,367,030 A 1/1983 Raymond
4,544,253 A 10/1985 Kummerl
5,396,309 A 3/1995 Morita et al.
6,040,896 A * 3/2000 Motooka ..................... 355/72
6,157,437 A * 12/2000 Kimura ....................... 355/40
6,179,495 B1 * 1/2001 Sugata et al. ............... 396/612

FOREIGN PATENT DOCUMENTS

JP 11-202421 7/1999
JP 2000-352768 12/2000
JP 2001-42445 2/2001

OTHER PUBLICATIONS

Japanese Abstract No. 11202418, dated Jul. 30, 1999.

* cited by examiner

*Primary Examiner*—Peter B. Kim
(74) *Attorney, Agent, or Firm*—Sughrue Mion, PLLC

(57) ABSTRACT

An image recording device which cuts an elongated photosensitive material, and disposes plural rows of photosensitive material sheets in parallel, and simultaneously conveys the photosensitive material sheets. The elongated photosensitive material pulled-out from a magazine is cut by a cutter into a plurality of sheet-shaped photographic printing papers of predetermined widths. The photographic printing papers are conveyed by first conveying roller pairs to predetermined positions on a conveying path. Due to nipping of the first conveying roller pairs being released, the photographic printing papers, which have been conveyed to conveying positions of respective rows, abut a stopper such that trailing ends of the photographic printing papers are aligned. Further, due to the plurality of photographic printing papers being nipped by second roller pairs, the plurality of photographic printing papers are conveyed toward an exposure position simultaneously in plural rows on the conveying path.

24 Claims, 18 Drawing Sheets

IMAGE RECORDING DEVICE HAVING A CONVEYING MECHANISM

BACKGROUND OF THE INVENTION

1. Field of the Invention

The present invention relates to an image recording device which exposes a photosensitive material and forms an image thereon.

2. Description of the Related Art

In recent years, printing devices using digital exposure, i.e., digital photoprinters, carrying out the following operations have come to be put into practice. A digital photoprinter photoelectrically reads an image recorded on a film, converts the read image into a digital signal, and thereafter, carries out various image processings on the digital signal so as to prepare image data for recording. The digital photoprinter scan-exposes a photosensitive material by recording light which has been modulated on the basis of the image data, so as to record an image (latent image) on the photosensitive material. The digital photoprinter then subjects the photosensitive material to developing processing and outputs the image as a print (photograph).

Such a digital photoprinter is basically structured by an input device having a scanner (image reading device) and an image processing device; and an output device having a printing device (image recording device) and a developing device. At the scanner, projected light of an image photographed on a film is photoelectrically read at an image sensor such as a CCD sensor or the like, and is sent to the image processing device as image data (an image data signal) of the film. The image processing device carries out predetermined image processings on the image data, and sends the processed image data to the printing device as output image data (exposure conditions) for image recording. If the printing device is, for example, a device utilizing light beam scan-exposure, the printing device deflects, in a main scanning direction, a light beam which has been modulated on the basis of the supplied image data, and conveys a photographic printing paper in a subscanning direction which is orthogonal to the main scanning direction. The printing device thereby forms a latent image on the photographic printing paper. The printing device also records predetermined items on the reverse surface of the photographic printing paper as a back print. In the developing device, a predetermined developing processing and the like are carried out on the exposed photographic printing paper, so as to form a print in which the image which was photographed on the film is reproduced.

Image recording devices have been proposed which aim to improve the printing speed (the image recording speed) by conveying sheet-shaped photographic printing papers in plural rows in the subscanning direction and scanning (exposing) a light beam in the main scanning direction.

In this case, in order to convey the sheet-shaped photographic printing papers in plural rows, structures such as the following have been proposed for example. In one such structure, a plurality of photosensitive material magazines are disposed in parallel, and the photographic printing paper which is supplied from each magazine is cut to a predetermined length such that sheet-shaped photographic printing papers are formed, and the sheet-shaped photographic printing papers are conveyed side by side. In another such structure, sheet-shaped photographic printing papers which are being conveyed in one row are distributed into plural rows by a distributing mechanism, e.g., a distributing mechanism using suction cups.

There have been proposed conventional image recording devices (see Japanese Patent Application Laid-Open (JP-A) No. 11-202418 for example) which aim to improve the printing speed by, while conveying sheet-shaped photosensitive materials in plural rows in the subscanning direction (a multi-row conveying system), simultaneously form latent images on the plural photosensitive materials, and carry out a predetermined developing processing and the like so as to reproduce images photographed on a film (i.e., so as to record images).

However, the type of device which has the plural magazines has the problem that, because plural magazines are needed, the device becomes large. Moreover, when the distributing mechanism is used, the mechanism is complex, and a problem arises in that control also becomes complex.

There are cases in which, among the plural photosensitive materials which are being conveyed in parallel, photosensitive materials do not exist at some of the rows, and the photosensitive materials exist in a state of being offset toward one longitudinal direction end portion of the conveying rollers.

As shown in FIG. 18, when a photosensitive material 200, which is being conveyed in a multi-row conveying system, is offset toward one longitudinal direction end portion of conveying rollers, an imbalance arises in the nipping force of a pair of conveying rollers 202, 204, by which nipping force the photosensitive material 200 is nipped.

Elastic members 206, such as helical tension springs or the like, are suspended between the respective rotating shafts projecting from the both end portions of the pair of conveying rollers 202, 204. Due to the urging forces of these elastic members 206, nipping force is generated at the photosensitive material 200 nipped between the pair of conveying rollers 202, 204.

Thus, when the photosensitive material 200 is offset toward one side of the pair of conveying rollers 202, 204, a space arises between the conveying rollers 202, 204 at the side where the photosensitive material 200 is nipped. The further toward the other side, the more this gap between the conveying rollers 202, 204 narrows, and the conveying rollers 202, 204 rotate while contacting one another.

Namely, the conveying rollers 202, 204 rotate while contacting the photosensitive material 200, in a state in which there is an imbalance in the nipping force nipping the photosensitive material 200 because the rotating shafts of the pair of conveying rollers 202, 204 are not parallel. Thus, a problem arises in that the photosensitive material 200 cannot be correctly conveyed in a predetermined direction.

In particular, at the time of carrying out exposure processing, when the nipping force becomes unbalanced at a subscanning section at which precise conveying is required, a problem arises in that it is not possible to convey the photosensitive material 200 straight, and the image formed on the photosensitive material 200 is adversely affected.

SUMMARY OF THE INVENTION

In order to overcome the above-described drawbacks, an object of the present invention is to provide an image recording device in which photographic printing papers can be distributed into plural rows by a simple structure.

Yet another object of the present invention is to provide an image recording device which can properly convey a photosensitive material which is being conveyed on a conveying path.

A first aspect of the present invention is an image recording device for exposing a photosensitive material, which is being conveyed, and recording an image on the photosensitive material, said image recording device comprising: a housing for housing the photosensitive material; a conveying path of the photosensitive material, which includes an intersection region, extends in a first direction towards the intersection region, and at the intersection region, further extends in a second direction, which intersects the first direction; a first conveying mechanism for pulling the photosensitive material out from the housing, conveying the photosensitive material in the first direction along the conveying path, and positioning at least one photosensitive material sheet at the intersection region; and a second conveying mechanism for conveying the at least one photosensitive material sheet, which is at the intersection region, from the intersection region in the second direction along the conveying path. The conveying path includes a first conveying path and a second conveying path.

The photosensitive material which is housed in the housing may be an elongated photosensitive material that is wound up. The first conveying mechanism may include a cutting tool for cutting the photosensitive material, which has been pulled out from the housing, so as to make the photosensitive material into at least one photosensitive material sheet having a desired length.

The first conveying mechanism may position a plurality of photosensitive recording sheets, which have been cut, at different positions over the intersection region.

The cutting tool may be disposed upstream, with respect to the first direction, of the intersection region, and successively carries out a cutting operation while the photosensitive material is being conveyed by the first conveying mechanism. Or, a plurality of cutting tools may be disposed at the intersection region, and may cut the photosensitive material after the photosensitive material reaches the intersection region.

The image recording device may further comprises a guide for positioning, with respect to the second conveying direction, the at least one photosensitive material sheet conveyed to the intersection region.

The photosensitive material, which is housed in the housing (housing means) such as a magazine or the like, can be conveyed by the first conveying mechanism to a plurality of conveying positions on the conveying path (the second conveying path) relative to the first direction which intersects the conveying path (the first conveying path). By the first conveying mechanism, the plurality of photosensitive materials can be distributed to (disposed at) the plurality of conveying positions on the conveying path. Next, due to the distributed plurality of photosensitive materials being conveyed by the second conveying mechanism in the second direction along the conveying path (the second conveying path), the photosensitive materials can be conveyed in plural rows toward the exposure position.

In this way, merely by conveying the photosensitive material sheets in the first direction by the first conveying mechanism, the plurality of photosensitive material sheets can be disposed (distributed) in parallel at a plurality of different positions on the conveying path which extends in the second direction which intersects the first direction. Namely, at the region on the conveying path where the first direction and the second direction intersect (the intersection region), the respective photosensitive material sheets are disposed in parallel with respect to the second direction. The photosensitive materials which are disposed in parallel can be conveyed in plural rows toward the exposure position merely by being conveyed in the second direction by the second conveying mechanism.

Moreover, conveyance for large-sized photosensitive material or conveyance of photosensitive material at an inactive time can be made single-row conveyance. Switching of this kind of conveyance can be performed simply.

The image recording device is provided with a cutter (cutting means) which cuts the elongated photosensitive material, which has been housed in the housing and pulled out to a predetermined length by the first conveying mechanism, so as to form sheet-shaped photosensitive materials of desired widths.

The cutter successively cuts the photosensitive material synchronously with the conveying of the photosensitive material by the first conveying mechanism, i.e., the cutter operates at predetermined timings while the photosensitive material is being conveyed.

The cutter successively cuts the photosensitive material into predetermined widths, synchronously with the conveying of the photosensitive material by the first conveying mechanism. Therefore, the cutting operation can be carried out in parallel with the distributing operation. Namely, the speed of the distributing processing is improved.

The cutter may cut the elongated photosensitive material at plural positions after the elongated photosensitive material has reached any of plural conveying positions on the conveying path by the first conveying mechanism. In this way, the cutter can make the elongated photosensitive material into a plurality of sheet-shaped photosensitive materials which are positioned at the plural conveying positions.

After the elongated photosensitive material which has been pulled-out from the housing is conveyed by the first conveying mechanism to any of the plural conveying positions, the cutter cuts the photosensitive material at a plurality of positions. In this way, sheet-shaped photosensitive materials which are cut to predetermined widths are in a state of being disposed (distributed) at the respective conveying positions. Namely, due to the cutter cutting the photosensitive material at the plural positions after the leading end of the elongated photosensitive material has been conveyed to any of the plural conveying positions on the conveying path, the operation of forming the sheet-shaped photosensitive materials of predetermined sizes, and the operation of distributing the photosensitive materials to the plural conveying positions, can be carried out simultaneously.

A guide is provided at the intersection region. The guide carries out positioning, with respect to the second conveying direction, of the photosensitive materials which have been conveyed to the conveying positions by the first conveying mechanism.

Due to the guide carrying out positioning, in the second direction, of the photosensitive materials which have been conveyed to the conveying positions on the conveying path by the first conveying mechanism, for example, the leading ends of the plural rows of photosensitive materials which are conveyed can be aligned. As a result, the photosensitive materials can be conveyed accurately, and recording of images of high image quality is possible.

A second aspect of the present invention is an image recording device for exposing a photosensitive material, which is being conveyed, and recording an image on the photosensitive material, said image recording device comprising: a housing for housing sheets of the photosensitive material; a conveying path of the photosensitive material, which includes an intersection region, extends in a first direction towards the intersection region, and at the intersection region, further extends in a second direction, which intersects the first direction; a first conveying mechanism for pulling the sheets of the photosensitive material out from the housing, conveying the sheets in the first direction along the conveying path, and positioning the sheets at respectively different conveying positions at the intersection region; and a second conveying mechanism for conveying the sheets of the photosensitive material, which are at the intersection region, from the intersection region and in the second direction along the conveying path.

The housing houses the sheets of the photosensitive material, which have been cut in advance to predetermined lengths.

In the above-described first aspect or second aspect, the image recording device may further comprise a position controller for controlling the positioning carried out by the first conveying mechanism, wherein the second conveying mechanism includes at least one pair of rollers, which are substantially orthogonal to the second direction and comprise peripheral surfaces of predetermined widths, and in a case in which plural sheets, which have substantially equal lengths relative to the second conveying direction, are nipped and conveyed in parallel by the at least one pair of rollers, the position controller positions the sheets such that a center of gravity of at least one sheet is positioned at one side and a center of gravity of at least one other sheet is positioned at another side, with respect to a line, which extends in the second direction and passes through a substantially central portion of a widthwise direction of the at least one pair of rollers.

Photosensitive material sheets, which have substantially equal lengths relative to the conveyance direction should be understood to include photosensitive material sheets, which have essentially equal lengths, and photosensitive material sheets, in the lengths of which some unevenness has been caused by errors at a time of cutting.

With such a structure, when the conveying rollers nip and convey the photosensitive materials, the balance of the nipping force applied to the respective photosensitive materials is maintained, and the photosensitive materials can be properly conveyed rectilinearly along the conveying path.

Moreover, the image recording device may further comprise a position controller for controlling the positioning carried out by the first conveying mechanism, wherein the second conveying mechanism includes at least one pair of rollers, which are substantially orthogonal to the second direction and have peripheral surfaces of predetermined widths, and in a case in which only a single sheet is conveyed by the at least one pair of rollers, the position controller positions the sheet such that one portion of the sheet travels on a line, which extends in the second direction and passes through a substantially central portion of a widthwise direction of the at least one pair of rollers.

With such a structure, when the conveying rollers nip and convey the photosensitive material, the balance of the nipping force applied to the photosensitive material is maintained stable, and the photosensitive material can be properly conveyed rectilinearly along the conveying path.

In addition, the image recording device may further comprise: a memory device for storing image data of images, which are to be recorded on photosensitive materials and belong to one group, and storing designated size information for the respective images; and an order controller for controlling an order of processing for image recording, wherein, on the basis of the size information, the order controller determines an order of image recording within the group such that processing of images of substantially the same size is executed in succession.

In accordance with the above structure, when image forming processing of plural photosensitive materials of different print sizes is carried out in the image recording device, cases in which plural photosensitive materials cannot be simultaneously conveyed on the conveying path are kept to a minimum, and the chances to simultaneously process a predetermined plural number of photosensitive materials are increased. In this way, a plurality of photosensitive materials can be processed efficiently, the speed relating to the processing is increased, and productivity is increased.

"Substantially the same size" means that lengths in the print conveyance direction are essentially equal. Length in the width direction may be different or length in the conveyance direction may include permissible errors in production.

BRIEF DESCRIPTION OF THE DRAWINGS

FIGS. 7A and 7B are plan views of the distributing mechanism relating to the second embodiment of the present invention, wherein FIG. 7A is a view illustrating a state before cutting, and FIG. 7B is a view illustrating a state after cutting.

DESCRIPTION OF THE PREFERRED EMBODIMENTS

Hereinafter, an image recording device relating to the embodiments of the present invention will be described with reference to the drawings. Then, a subscanning conveying section, which is a main portion of the image recording device, will be described in detail.

(Overall Structure of Image Recording Device)

An image recording device 10 is formed from a printer (image recording device) 12 and a processor 14, and is used mainly for image formation of a digital photoprinter. The printer 12 scan-exposes photographic printing papers by a light beam so as to form latent images, on the basis of image information read by an unillustrated image reading device such as a film scanner, or in accordance with exposure conditions which have been determined at a set-up device. The processor 14 subjects the photographic printing papers, on which the latent images have been formed, to developing processing, and outputs prints on which are recorded the images of the film.

Figure 1:
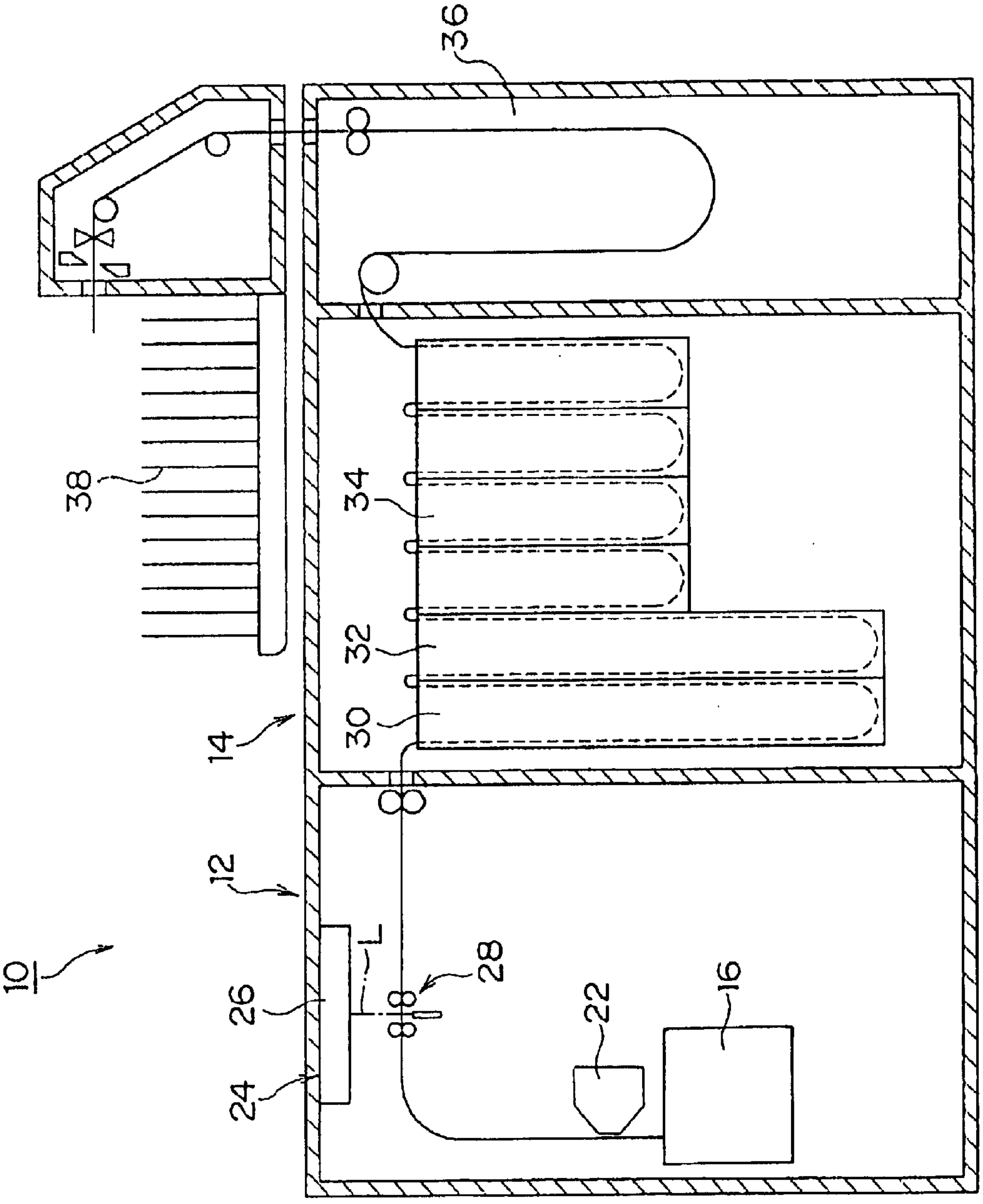
FIG. 1 is a diagram for explanation which summarily illustrates an image recording device relating to embodiments of the present invention.

As shown in FIG. 1, a magazine 16 is disposed in the printer 12. A photographic printing paper, which is wound in roll form, is accommodated in the magazine 16. The elongated photographic printing paper, which is pulled-out from the magazine 16, is disposed in plural rows on a conveying path by a distributing mechanism 50 which will be described later, and is made into sheet-shaped photographic printing papers.

A backprint section 22, which prints predetermined information on the back surfaces of the photographic printing papers, is disposed at the downstream side of the conveying path along which the sheet-shaped photographic printing papers are conveyed. An exposure section 24, which records predetermined images on the emulsion surfaces of the photographic printing papers, is provided at the downstream side of the backprint section 22.

The exposure section 24 has a light scanning device 26 which exposes photographic printing papers A on the basis of predetermined image information, and a subscanning conveying section 28 which accurately conveys the photographic printing papers to the exposure position and ensures the flatness of the photographic printing papers.

A developing tank 30, a fixing tank 32, a rinsing tank 34, and a drying section 36 are disposed along the conveying path within the processor 14 in which is conveyed the photographic printing paper A on which a predetermined image was recorded in the exposure section 24. Due to the photographic printing paper A successively passing therethrough, a single print is formed. The print is then discharged to a sorter 38.

(Structure of Distributing Mechanism)

The distributing mechanism 50 in the printer 12 which is formed in this way will be described in detail.

Figure 2:
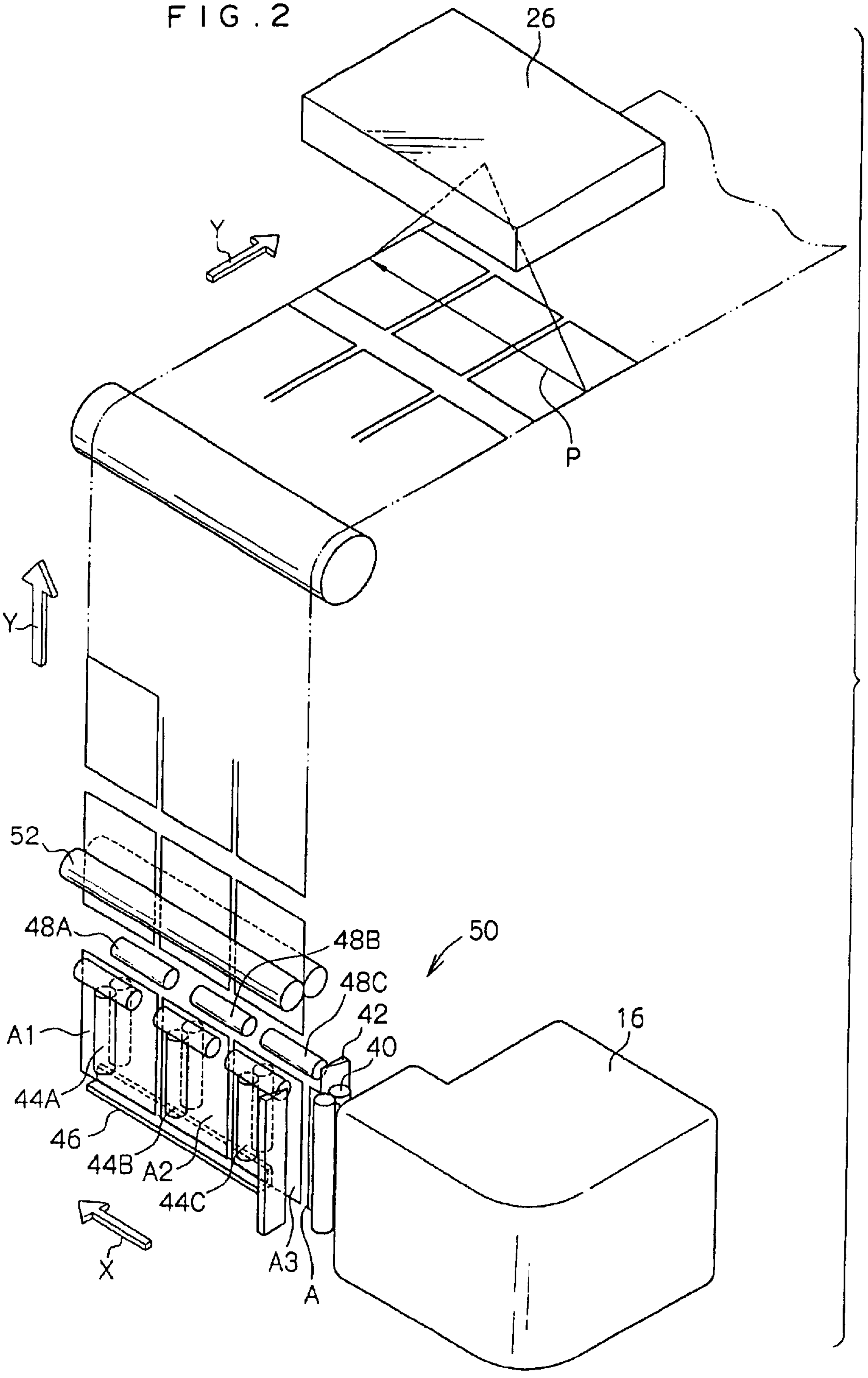
FIG. 2 is a schematic perspective view of a conveying path including a distributing mechanism relating to a first embodiment of the present invention.

As shown in FIG. 2, the distributing device 50 is basically formed from a pull-out roller pair 40 which pulls out the elongated photographic printing paper A from the magazine 16; a cutter 42 which cuts, to a predetermined length, the photographic printing paper A which has been pulled out by the pull-out roller pair 40; three first conveying roller pairs 44A, 44B, 44C which convey, to conveying positions, sheet-shaped photographic printing papers A1, A2, A3 which have been cut to the predetermined length (predetermined width) by the cutter 42; a stopper 46 which carries out trailing end alignment of the sheet-shaped photographic printing papers A which have been disposed at the conveying positions on the conveying path by the first conveying roller pairs 44A, 44B, 44C; and second conveying roller pairs 48A, 48B, 48C which convey the photographic printing papers A, whose trailing ends have been aligned at the stopper 46, toward the exposure position.

The cutter 42 cuts the elongated photographic printing paper A, which has been pulled-out by the pull-out roller pair 40 from the magazine 16, into predetermined lengths so as to form the photographic printing papers A1, A2, A3 which have predetermined widths.

The first conveying roller pairs 44A, 44B, 44C are disposed at predetermined intervals in a direction (the main scanning direction) orthogonal to a direction (the subscanning direction) in which the photographic printing papers A are conveyed in plural rows as will be described later. The first conveying roller pairs 44A, 44B, 44C are respectively structured so as to be movable by an unillustrated mechanism, so as to form a nip and such that the formed nip is released.

Namely, due to the sheet-shaped photographic printing papers A1, A2, A3 being nipped and conveyed in the main scanning direction, the photographic printing papers A1, A2, A3 can be conveyed to any of the plural conveying positions on the conveying path. Here, the conveying position is the portion of the conveying path along which the photographic printing papers A are conveyed in plural rows toward the exposure position. It suffices for the conveying mechanism which forms the conveying path to be able to convey the photographic printing papers A1, A2, A3, e.g., the conveying mechanism may be conveying roller pairs, belts, or the like, but the conveying mechanism is not particularly limited to these. Further, in the present embodiment, the direction of conveying the photographic printing papers on the conveying path is the subscanning direction (the direction of arrow Y), and the direction orthogonal to the subscanning direction on the conveying path is the main scanning direction (the direction of arrow X).

Figure 3A:
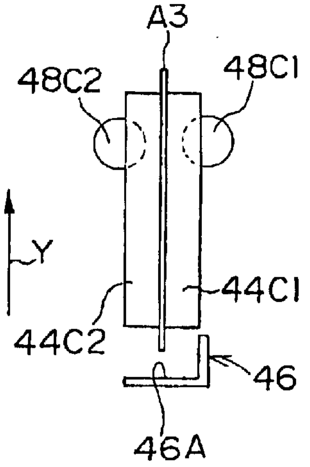
FIGS. 3A through 3C are diagrams for explanation of trailing end alignment at the distributing mechanism relating to the first embodiment of the present invention.
Figure 3B:
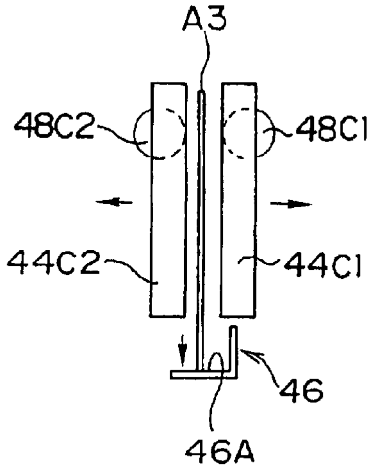
Figure 3C:
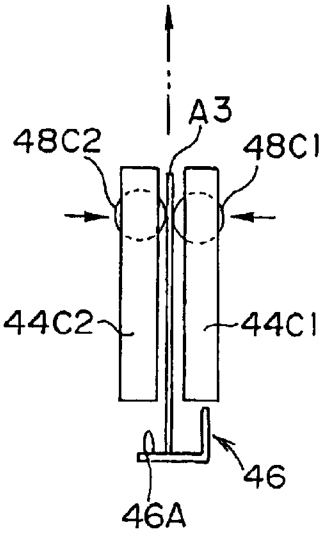

The stopper 46 is disposed beneath the first conveying roller pairs 44A, 44B, 44C. As shown in FIGS. 3A through 3C, the stopper 46 is formed in an L-shape as seen in side view. Accordingly, the lower ends (trailing ends) of the photographic printing papers A1, A2, A3, which have been positioned at (distributed to) the different conveying positions in the main scanning direction on the conveying path by the first conveying roller pairs 44A, 44B, 44C, abut the stopper 46 after the nipping by the first conveying roller pairs 44A, 44B, 44C is released.

Figure 4:
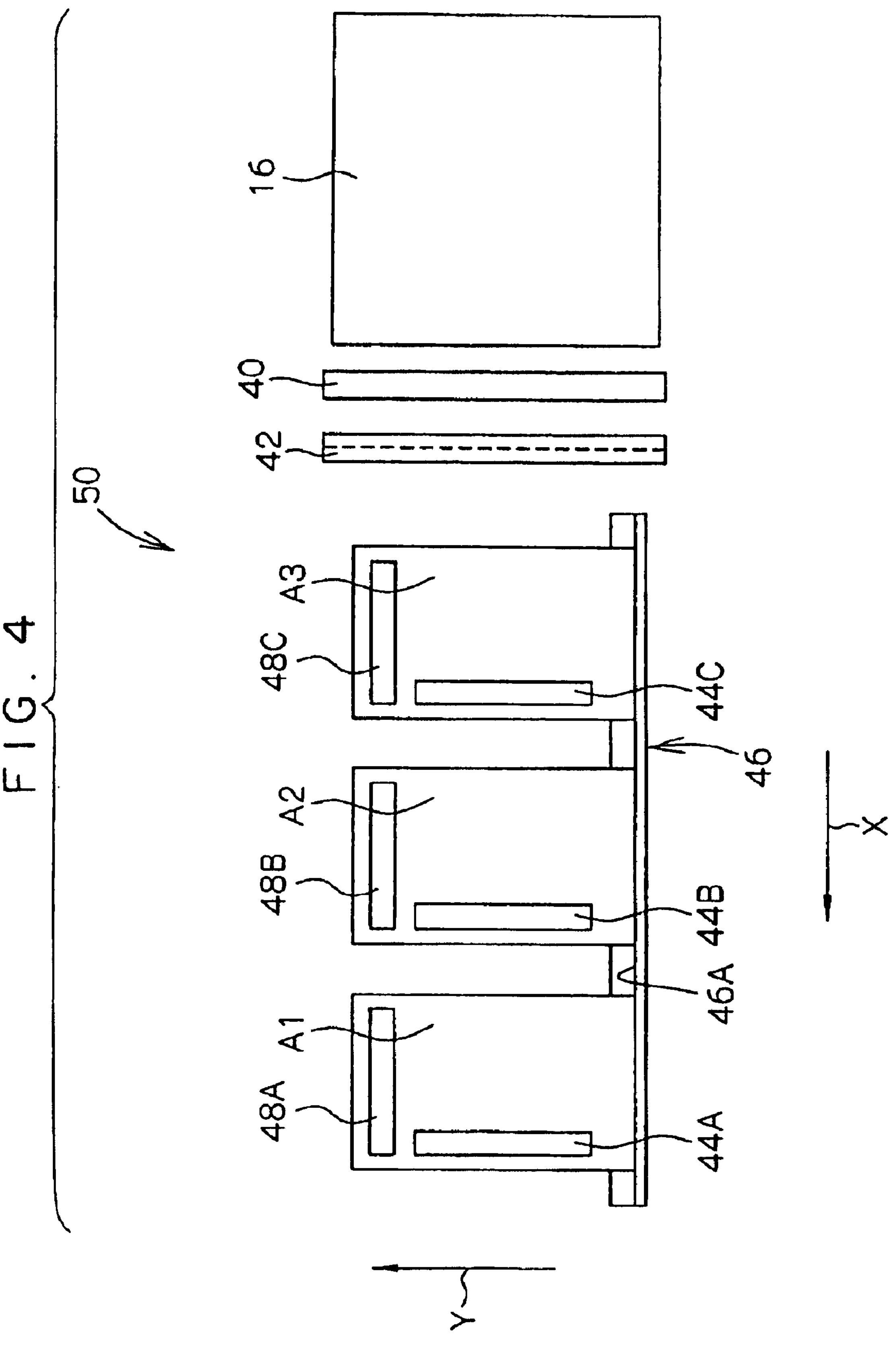
FIG. 4 is a plan view of the distributing mechanism relating to the first embodiment of the present invention.

The second conveying roller pairs 48A, 48B, 48C (see FIGS. 2, 4, 5), which carry out conveying in the subscanning direction which is orthogonal to the conveying direction by the first conveying roller pairs 44A, 44B, 44C, are disposed at the exposure position P side (the conveying direction downstream side) of the first conveying roller pairs 44A, 44B, 44C disposed on the conveying path. The second conveying roller pairs 48A, 48B, 48C also are respectively structured so as to be able to form a nip and such that the formed nip can be released. Accordingly, the sheet-shaped photographic printing papers A1, A2, A3, which are positioned at predetermined positions by the first conveying roller pairs 44A, 44B, 44C and the stopper 46, are nipped by the second conveying roller pairs 48A, 48B, 48C and conveyed in the subscanning direction. Note that the nips of the second conveying roller pairs 48A, 48B, 48C are released during the time when the first conveying roller pairs 44A, 44B, 44C are nipping the photographic printing papers A1, A2, A3 and during the time that the stopper 46 is aligning the trailing ends. Therefore, the second conveying roller pairs 48A, 48B, 48C do not interfere with the photographic printing papers A1, A2, A3 which are being conveyed in the main scanning direction.

The operation of the printer 12 which is structured in this way will be described.

When image information is inputted to the printer 12, the photographic printing paper A is pulled out from the magazine 16 by the pull-out rollers 40, and is cut to predetermined lengths by the cutter 42. By cutting the photographic printing paper A to the substantially equal lengths (some unevenness caused by errors are permissible) for example, the elongated photographic printing paper A can be made into the sheet-shaped photographic printing papers A1, A2, A3 having the substantially equal widths (some unevenness caused by errors are permissible). The photographic printing papers A1, A2, A3 are positioned at the conveying positions of the respective rows on the conveying path by the first conveying roller pairs 44A, 44B, 44C. Specifically, when the photographic printing paper A1 reaches the conveying position of the first row, driving of the first conveying roller pair 44A is stopped. When the photographic printing paper A2 and the photographic printing paper A3 as well reach the conveying positions of the second and third rows respectively, the driving of the first conveying roller pairs 44B, 44C is stopped (see FIG. 2). In this way, due to the photographic printing papers A1, A2, A3 being conveyed in the main scanning direction and being positioned at the conveying positions by the first conveying roller pairs 44A, 44B, 44C, the photographic printing papers A1, A2, A3 are distributed (disposed) at the conveying positions of the plural rows on the conveying path.

In this way, after the photographic printing papers A1, A2, A3 have been distributed to the predetermined positions in the main scanning direction, due to the nips of the first conveying roller pairs 44A, 44B, 44C being released, the photographic printing papers A1, A2, A3 drop down such that the bottom ends thereof abut a lower surface 46A of the stopper 46 (see FIG. 3A and FIG. 3B). As a result, the trailing ends of the photographic printing papers A1, A2, A3 are abutted by the lower surface 46A of the stopper 46, and the positions of the leading ends of the photographic printing papers A1, A2, A3 are aligned. Namely, the leading ends of the photographic printing papers A1, A2, A3 can be aligned (see FIG. 4) even in a case in which the leading ends are offset in the subscanning direction due to cutting by the cutter 42 or the like.

Figure 5:
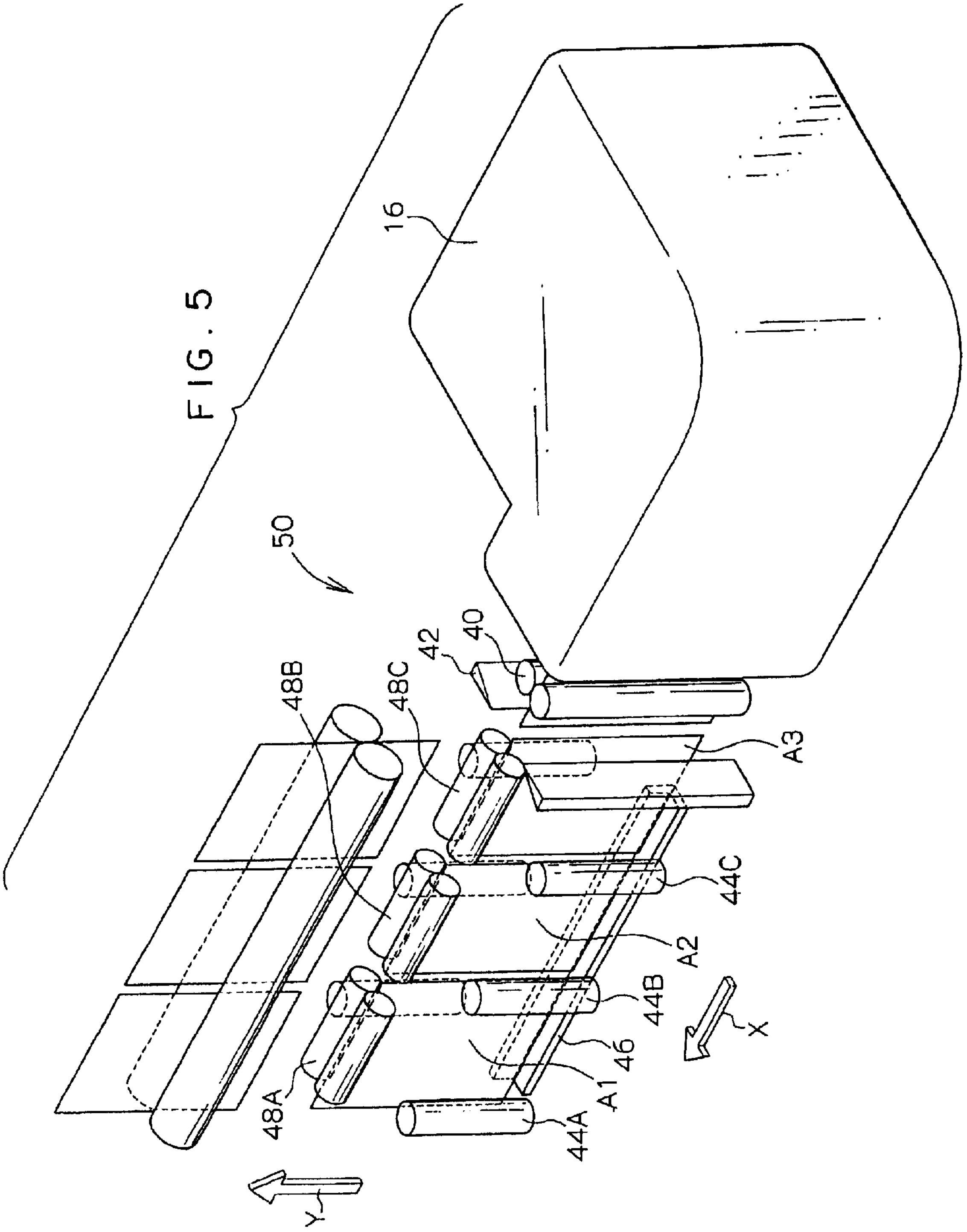
FIG. 5 is a schematic perspective view of the distributing mechanism relating to the first embodiment of the present invention.

Next, the second conveying roller pairs 48A, 48B, 48C nip the leading ends of the photographic printing papers A1, A2, A3 (see FIG. 3C, FIG. 5). As a result, the photographic printing papers A1, A2, A3 can be conveyed toward the exposure position in a state in which the leading end (trailing end) positions thereof are positioned.

By driving the second conveying roller pairs 48A, 48B, 48C, the photographic printing papers A1, A2, A3, whose leading ends have been aligned, are simultaneously conveyed in a state in which the leading ends thereof are aligned. Note that, the second conveying roller pairs 48A, 48B, 48C are separated such that the photographic printing papers A1, A2, A3 of the three rows can be conveyed with the conveying timings thereof offset from one another. However, a conveying roller pair 52, which is the second set of conveying rollers on the conveying path or a set thereafter, may be structured by a pair of single rollers whose lengths extend along the entire width of the conveying path.

Printing onto the reverse surfaces of the photographic printing papers A1, A2, A3, which are conveyed on the conveying path in this way, is carried out at the backprint section 22. Thereafter, the photographic printing papers A1, A2, A3 reach the subscanning conveying section 28.

As shown in FIG. 2, the photographic printing papers A1, A2, A3 which have reached the subscanning conveying section 28 are simultaneously scan-exposed by the light scanning device 26, with the photographic printing papers A1, A2, A3 being in a state of being aligned in plural rows. Note that a structure such as the following is possible: the boundary positions or the sizes of the individual photographic printing papers A1, A2, A3 are detected by an unillustrated sensor or the like on the basis of the intervals between the photographic printing papers A1, A2, A3 which are set in plural rows by the distributing mechanism 50, or the like. By inputting this detection data in advance to an output data preparing section (not shown) of the light scanning device 26, the output data preparing section can judge how the image data of each image frame should be outputted, and can quickly prepare output data.

In this way, in the present embodiment, the elongated photographic printing paper A, which is pulled out from the magazine 16 by the pull-out roller pair 40, is cut by the cutter 42 into the sheet-shaped photographic printing papers A1, A2, A3 of predetermined widths. Due to the first conveying roller pairs 44A, 44B, 44C conveying the photographic printing papers A1, A2, A3 to the conveying positions of the three rows in the main scanning direction which is orthogonal to the subscanning direction, the sheet-shaped photographic printing papers A1, A2, A3 can be distributed to the conveying positions of the three rows on the conveying path. Further, the first conveying roller pairs 44A, 44B, 44C distribute the photographic printing papers A1, A2, A3 merely by pulling them out in the same direction (the main scanning direction) as the direction of pulling out by the pull-out roller pair 40. Thus, scratching of the photographic printing papers A1, A2, A3 and uneven pressure thereat due to forced feeding can be avoided. Further, due to the photographic printing papers A1, A2, A3, which have been distributed into the three rows, being nipped by the second conveying roller pairs 48A, 48B, 48C, the photographic printing papers A1, A2, A3 can be conveyed simply in the subscanning direction.

At this time, due to the nipping of the first conveying roller pairs 44A, 44B, 44C being cancelled before the second conveying roller pairs 48A, 48B, 48C nip the photographic printing papers A1, A2, A3, the trailing ends of the photographic printing papers A1, A2, A3 abut the stopper 46. The trailing ends (leading ends) of the photographic printing papers A, which may be offset in the subscanning direction due to cutting by the cutter 42 or the like, are aligned. Accordingly, because the photographic printing papers A1, A2, A3 whose leading ends are aligned can be conveyed and scan-exposed, the recording of images of high image quality can be carried out.

Note that, in the present embodiment, positioning in the subscanning direction is carried out by the nipping of the photographic printing papers A1, A2, A3 by the first conveying roller pairs 44A, 44B, 44C being released and the photographic printing papers A1, A2, A3 abutting the stopper 46, after the photographic printing papers A1, A2, A3 have been conveyed in the main scanning direction. However, a structure may be used in which this process is eliminated, and the photographic printing papers A1, A2, A3 are conveyed in a horizontal state by the first conveying roller pairs 44A, 44B, 44C up to predetermined positions in the main scanning direction, and then the photographic printing papers A1, A2, A3 are nipped by the second conveying roller pairs 48A, 48B, 48C and conveyed in the subscanning direction.

(Second Embodiment)

An image recording device relating to a second embodiment of the present invention will be described. Note that, structural elements which are similar to those of the first embodiment are denoted by the same reference numerals, and detailed description thereof is omitted. The only portion which differs from the first embodiment is a distributing mechanism 54, and this portion will be described.

Figure 6:
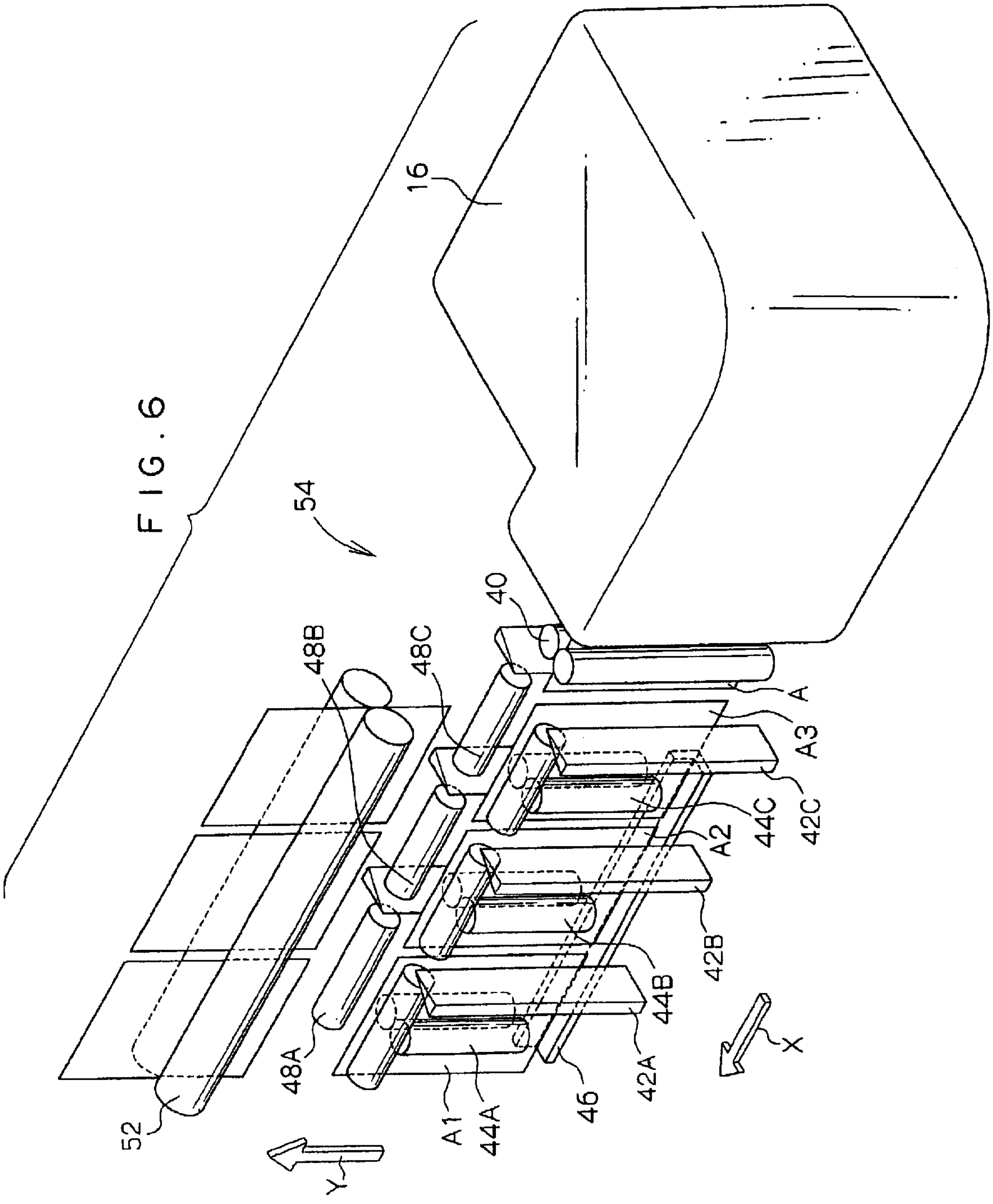
FIG. 6 is a schematic perspective view of a distributing mechanism relating to a second embodiment of the present invention.

As shown in FIG. 6, in the distributing mechanism 54, three cutters 42A, 42B, 42C are disposed at predetermined intervals along the conveying path, in place of the cutter 42 used in the first embodiment.

Figure 7A:
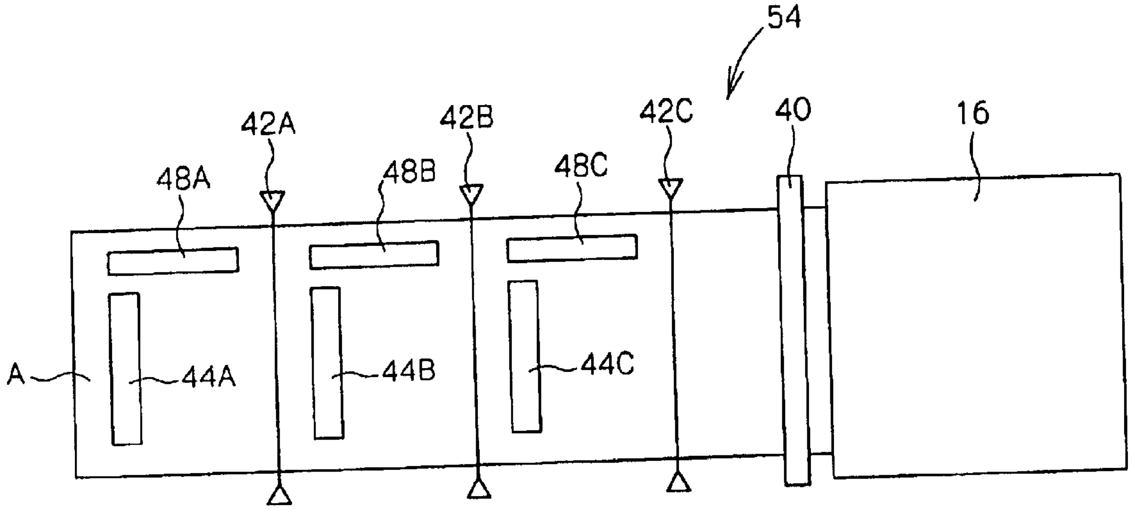
Figure 7B:
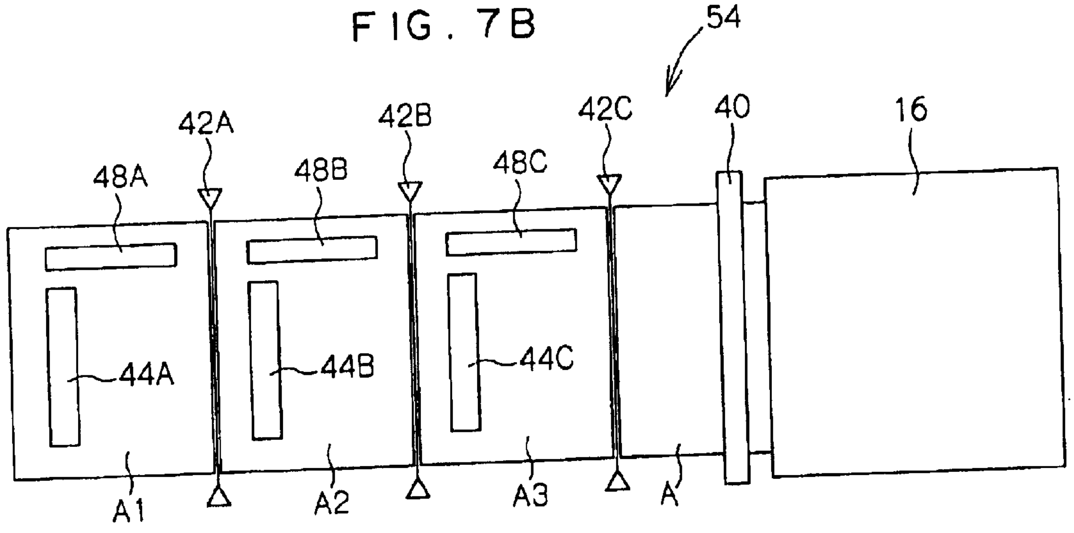

By structuring the device in this way, the elongated photographic printing paper A which is pulled out from the magazine 16 is conveyed by the first conveying roller pairs 44A, 44B, 44C to the conveying position of the first row (the furthest to the left in FIG. 7A), which is the furthest among the conveying positions of the three rows (see FIG. 7A). In this state, by cutting the photographic printing paper A by the cutters 42A, 42B, 42C (see FIG. 7B), the sheet-shaped photographic printing papers A1, A2, A3 of predetermined widths are formed, and the operation of distributing (positioning) in the main scanning direction is completed.

In this state, by releasing the nips of the first conveying roller pairs 44A, 44B, 44C, the trailing ends of the photographic printing papers A1, A2, A3 abut the stopper 46 such that trailing end alignment is carried out. Thereafter, operations are the same as those of the first embodiment.

In this way, in the present second embodiment, the leading end of the photographic printing paper A, which is pulled out from the magazine 16 by the pull-out roller pair 40, is conveyed by the first conveying roller pairs 44A, 44B, 44C to the conveying position of the first row on the conveying path, without the photographic printing paper A being cut. Then, the photographic printing paper A is cut by the three cutters 42A, 42B, 42C which are disposed at predetermined positions. In this way, the sheet-shaped photographic printing papers A1, A2, A3 can be positioned (distributed) at the conveying positions of the three rows in the main scanning direction.

The present second embodiment differs from the first embodiment and differs from a structure in which the sheet-shaped photographic printing papers A1, A2, A3 are cut one-by-one from the elongated photographic printing paper A. The present second embodiment has the advantage that the cutting operation can be carried out at a single time.

(Third Embodiment)

An image recording device relating to a third embodiment of the present invention will be described. Note that structural elements which are similar to those of the first and second embodiments are denoted by the same reference numerals as in the first and second embodiments, and detailed description thereof is omitted. The only portion which differs from the first and second embodiments is a distributing mechanism 56, and only this portion will be described.

Figure 8:
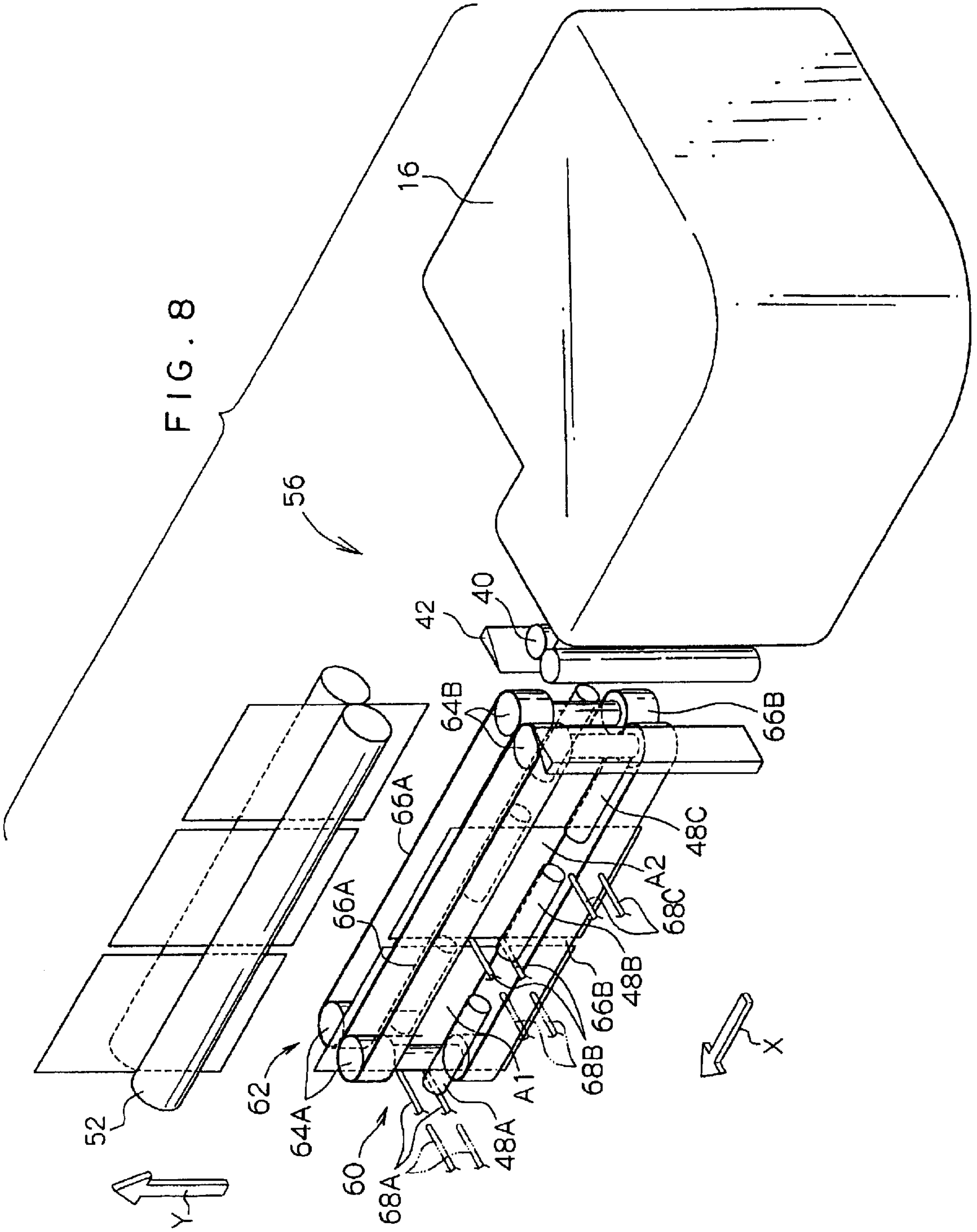
FIG. 8 is a schematic perspective view of a distributing mechanism relating to a third embodiment of the present invention.

As shown in FIG. 8, the distributing mechanism 56 is provided with pairs of conveying belts 60, 62 instead of the first conveying roller pairs 44A, 44B, 44C of the first and second embodiments.

Figure 9:
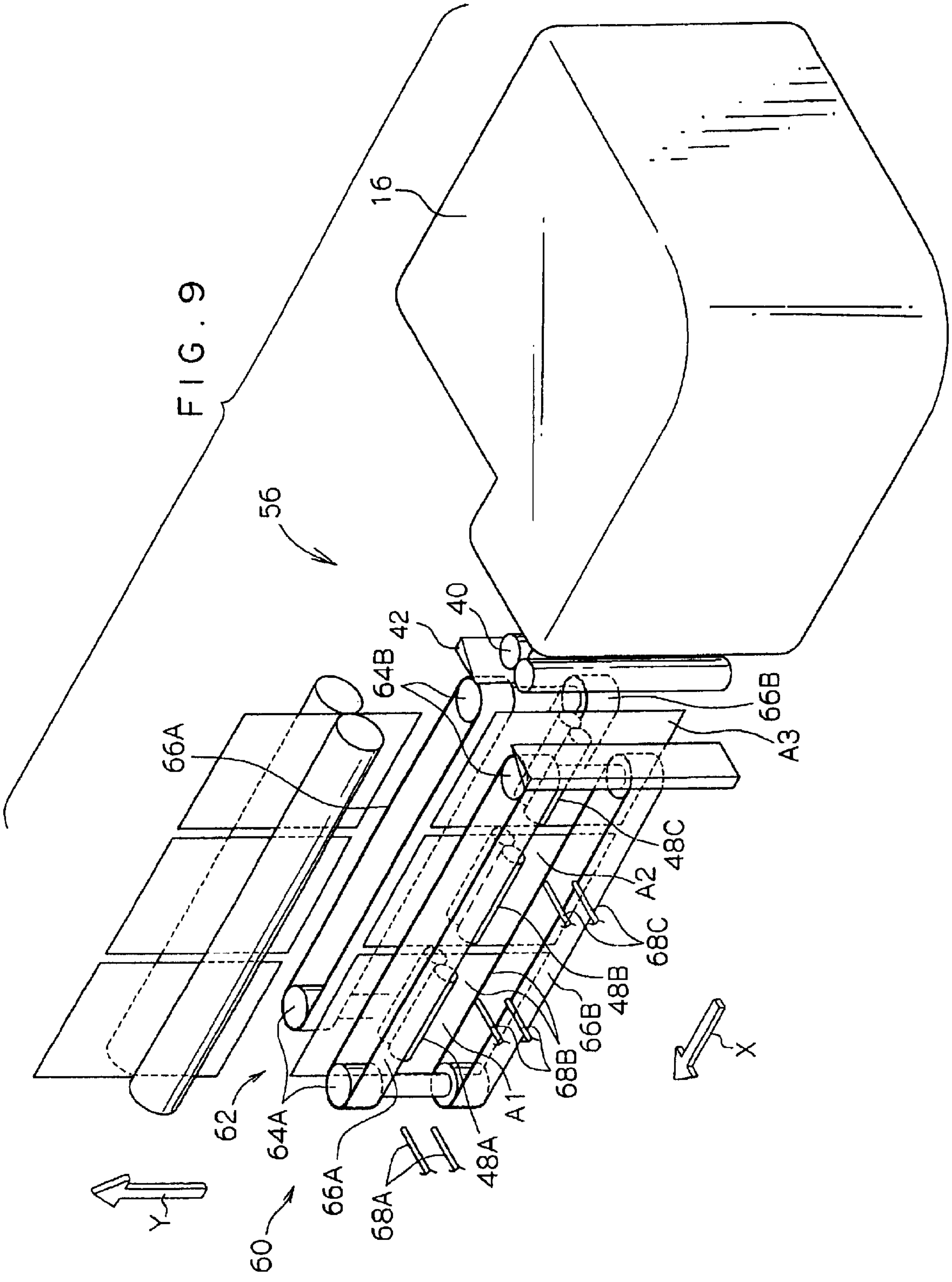
FIG. 9 is a schematic perspective view of the distributing mechanism relating to the third embodiment of the present invention.
Figure 10:
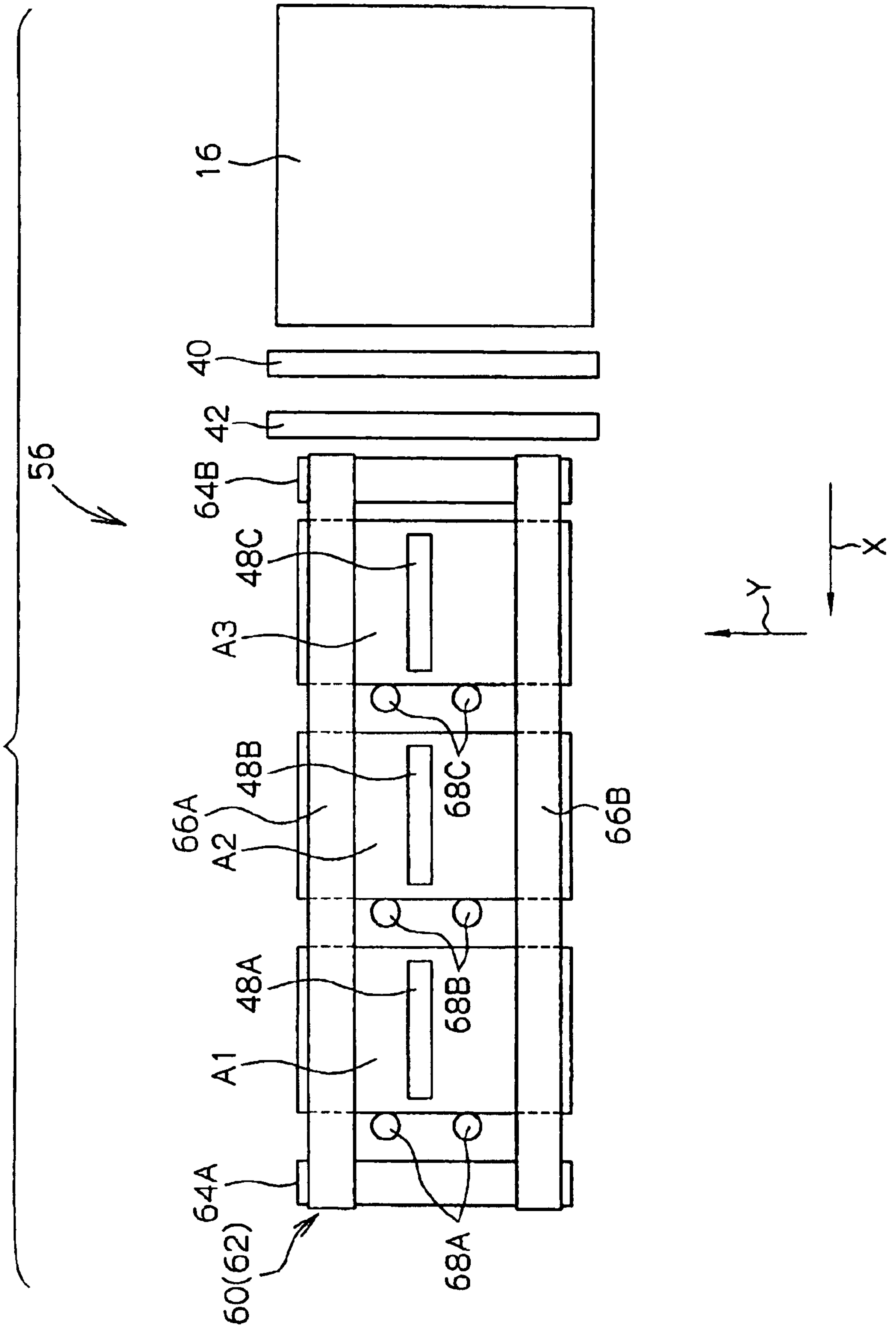
FIG. 10 is a plan view of the distributing mechanism relating to the third embodiment of the present invention.

As shown in FIGS. 8 through 10, the conveying belt 60 is formed by tension rollers 64A, 64B, and endless belts 66A, 66B which are trained around the tension rollers 64A, 64B. The endless belts 66A, 66B are trained around vicinities of the both ends of the tension rollers 64A, 64B. A space at which the second conveying roller pairs 48A, 48B, 48C can be provided is ensured between the endless belts 66A, 66B. Note that, in FIGS. 8 and 9, for convenience of explanation, the tension rollers 64A, 64B are illustrated so as to each be divided and separated at the top and bottom thereof. However, in actuality, the tension rollers 64A, 64B may each be one roller (see FIG. 10). The same holds for the conveying belt 62.

The conveying belts 60, 62 are structured so as to be movable in directions of approaching and moving away from each other (i.e., the conveying belts 60, 62 are able to be separated from and contacted with one another). By making the conveying belts 60, 62 approach one another and nip the photographic printing papers A1, A2, A3, the photographic printing papers A1, A2, A3 are nipped between the endless belts 66A, 66A and the endless belts 66B, 66B, and are conveyed in the main scanning direction.

Further, pairs of pin members 68A, 68B, 68C are disposed so as to be able to freely advance and withdraw, in the space formed between the endless belts 66A and the endless belts 66B, in order to position, at the plurality of conveying positions, the sheet-shaped photographic printing papers A1, A2, A3 which are to be distributed to the respective rows. Namely, due to the pin members 68A, 68B, 68C being inserted to anchoring positions, the photographic printing papers A1, A2, A3 which are being conveyed by the conveying belts 60, 62 are anchored at the conveying positions of the respective rows.

Operation of the image recording device which is structured in this way is as follows.

In the distributing mechanism 56, as shown in FIG. 8, the photographic printing paper A, which has been pulled out by a predetermined length from the magazine 16 by the pull-out rollers 40, is successively cut by the cutter 42. The sheet-shaped photographic printing papers A1, A2, A3 of desired widths are thereby formed.

At this time, the nips of the second conveying roller pairs 48A, 48B, 48C are released, and the pin members 68B, 68C (the positions shown by the two-dot chain lines) are withdrawn from their anchoring positions (see FIG. 6).

Accordingly, the sheet-shaped photographic printing paper A1, whose subscanning direction both end portions are being nipped by the conveying belts 60, 62, is conveyed in the main scanning direction until it is anchored on the pin members 68A which are inserted to their anchoring positions.

The pin members 68B are inserted from their withdrawn positions to their anchoring positions (move from the positions shown by the two-dot chain lines to the positions shown by the solid lines in FIG. 8) at the time when the photographic printing paper A1 is anchored by the pin members 68A. As a result, the photographic printing paper A2, which is conveyed in by the conveying belts 60, 62 following the photographic printing paper A1, is anchored by the pin members 68B.

The pin members 68C are inserted from their withdrawn positions to their anchoring positions at the time when the photographic printing paper A2 is anchored by the pin members 68B. The photographic printing paper A3, which is conveyed in by the conveying belts 60, 62 following the photographic printing paper A2, is anchored by the pin members 68C, and the driving of the conveying belts 60, 62 is stopped.

As a result, as shown in FIG. 10, the leading ends in the main scanning direction of the photographic printing papers A1, A2, A3 are anchored by the pin members 68A, 68B, 68C, and are positioned at the conveying positions of the respective rows.

Next, the second conveying roller pairs 48A, 48B, 48C nip the photographic printing papers A1, A2, A3 respectively. Moreover, the conveying belts 60, 62 move apart from one another, and the pin members 68A, 68B, 68C are withdrawn from their anchoring positions (see FIG. 9).

In this state, by driving the second conveying roller pairs 48A, 48B, 48C, the photographic printing papers A1, A2, A3 which have been distributed into the three rows can be conveyed toward the exposure position. In accordance with such a structure as well, the same operational effects as those of the first embodiment can be achieved.

In the present embodiment, the photographic printing papers A1, A2, A3 are nipped by the conveying belts 60, 62 and conveyed in the main scanning direction. However, a structure is possible in which the photographic printing papers A1, A2, A3 are placed on and conveyed by a conveying belt which conveys the photographic printing papers horizontally.

In the first through third embodiments, the elongated photographic printing paper A is supplied from the magazine 16. However, sheet-shaped photographic printing papers may be supplied. With such a structure, there is no need for a cutter.

Moreover, even when a cutter is used, a method can be conceived of in which a blade extending in an axial direction is provided on the outer peripheral surface of one of the rollers of the pull-out roller pair 40, and a concave portion extending in the axial direction is provided in the outer peripheral surface of the other roller, and the photographic printing paper A is cut to predetermined lengths synchronously with the rotational cycle of the rollers. With such a structure, there is the advantage that the feed rollers (the pull-out roller pair 40 or the first conveying roller pairs 44A, 44B, 44C) can function as the cutter as well.

(Fourth Embodiment)

An image recording device, which relates to a fourth embodiment of the present invention and which can properly convey photosensitive materials which are being conveyed on the conveying path of a multi-row conveying system, will be described hereinafter in accordance with FIGS. 11 through 14. Note that, in FIGS. 11 through 14, structural elements which are the same as those of the above-described first embodiment illustrated in FIGS. 1 through 5 are denoted by the same reference numerals, and detailed description thereof is omitted.

Figure 11:
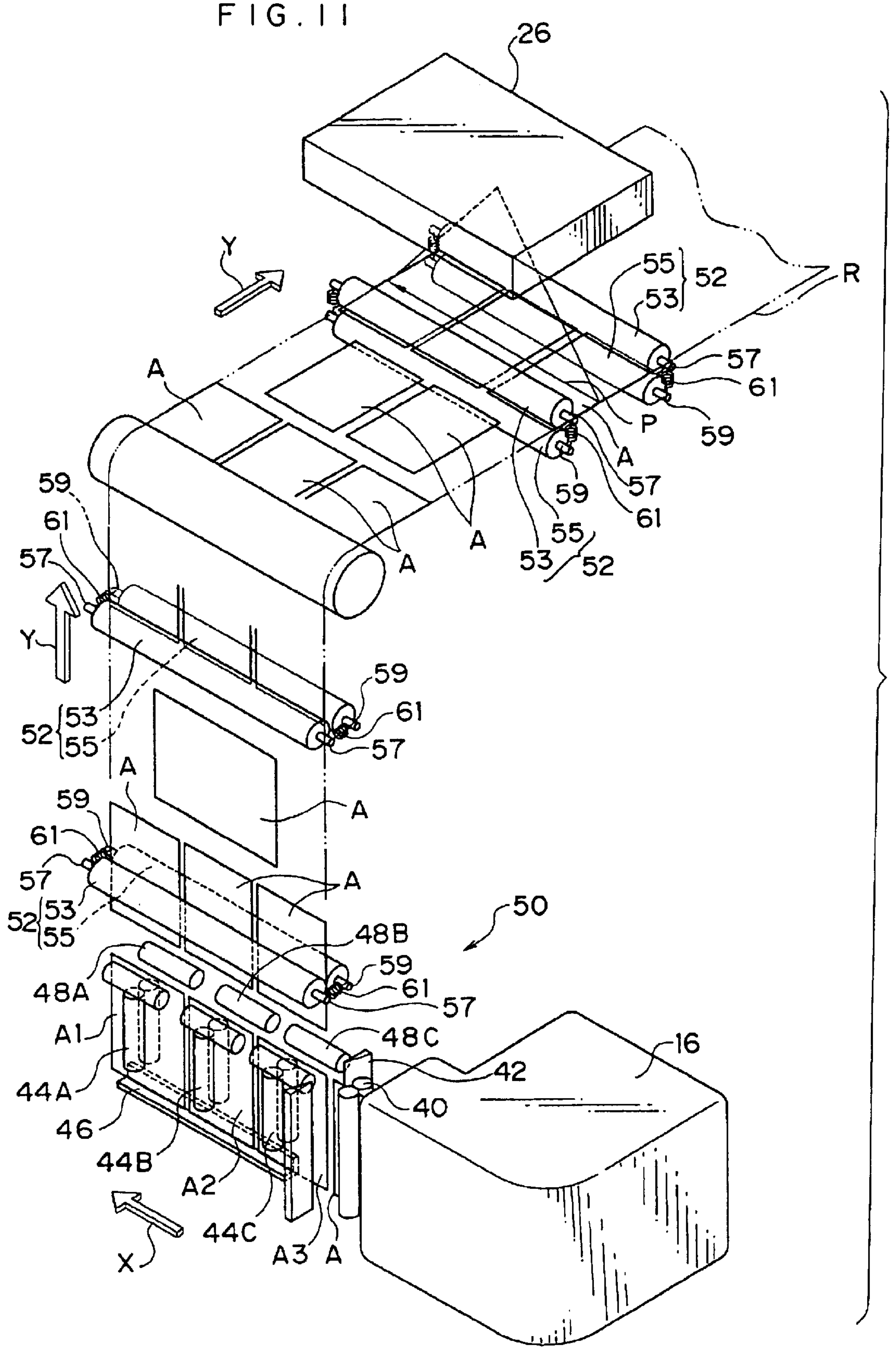
FIG. 11 is a schematic perspective view of a conveying path of a multi-row conveying system having a distributing mechanism relating to a fourth embodiment of the present invention.

In this image recording device, a plurality of the conveying roller pair 52, which is the second set of conveying rollers on the conveying path or a set thereafter, are disposed at predetermined intervals in consideration of the conveying direction lengths of the photosensitive materials A, in order to convey the photosensitive materials A, which are sheet-shaped photographic printing papers disposed in a single row or plural rows, on a conveying path R of a multi-row conveying system shown by the imaginary lines in FIG. 11.

The photosensitive materials A are disposed and conveyed in single or plural rows on the conveying path R of the multi-row conveying system. By lining a single or plural photosensitive materials A up in the direction (the widthwise direction) orthogonal to the conveying direction of the conveying path R, the photosensitive materials A are conveyed in a state of forming a single row or plural rows with respect to the conveying direction.

The conveying roller pairs 52 which are disposed on the conveying path R of the multi-row conveying system, are respectively formed by a pair of rollers for conveying 53, 55 which have the same shape. The rollers for conveying 53, 55 form a pair of rollers having lengths extending along the entire length (the entire width) in the direction orthogonal to the conveying direction of the conveying path R. Shaft members 57, 59, which extend along the rotational axes, project from the both end portions of the rollers 53, 55, respectively.

The conveying rollers pairs 52 are disposed on the conveying path R at intervals, in the conveying direction, which are less than or equal to the distance of the smallest size among the photosensitive materials A. However, in FIG. 11, some of the conveying roller pairs 52 are omitted from illustration in order to more clearly illustrate the arrangement of the photosensitive materials A which are being conveyed on the conveying path R.

The shaft members 57, 59 are rotatably supported by generally-used rotational supporting (bearing) mechanisms. In this way, the pair of rollers for conveying 53, 55 are mounted such that they rotate with the outer peripheral surfaces thereof contacting one another, in a state in which their rotational shafts are parallel to one another.

Moreover, the pair of rollers 53, 55 are mounted, by the rotating supporting mechanisms which support the shaft members 57, 59 projecting from the both end portions of the pair of rollers 53, 55, such that the distance between the axes of the respective shaft members 57, 59 can be varied, so that the interval between the pair of rollers 53, 55 can be opened to an interval which is greater than or equal to the thickness of the photosensitive material A.

At the rotating supporting mechanisms, elastic members 61, such as helical tension springs or the like, are suspended between the shaft members 57, 59 projecting out from the both end portions of the rollers 53, 55. Due to the urging forces of the elastic members 61, nipping force is applied to the photosensitive material A nipped between the pair of rollers for conveying 53, 55.

Accordingly, at the rotating supporting mechanisms, at one end portion of the rollers 53, 55, the elastic member 61 independently applies urging force such that the distance between the axes of the pair of rollers 53, 55 is narrowed, and at the other end portion of the rollers 53, 55 as well, the elastic member 61 independently applies urging force such that the distance between the axes of the pair of rollers 53, 55 is narrowed.

Thus, at the rotating supporting mechanisms of the conveying roller pair 52, when the photosensitive material A is nipped at a position which is offset toward one side from the central portion (a point) in the rotational axial direction (the longitudinal direction) of the rollers for conveying 53, 55, the nipping force nipping the photosensitive material A becomes unbalanced at the time when the pair of rollers for conveying 53, 55 convey the photosensitive material A by rotating while contacting and nipping the photosensitive material A.

Namely, a gap arises between the pair of rollers 53, 55 at the side where the photosensitive material A is nipped by the conveying roller pair 52. The further toward the other side, the more this gap between the pair of rollers 53, 55 narrows. The rollers 53, 55 rotate while contacting the photosensitive material A in a state in which the rotational axes of the rollers 53, 55 are not parallel to one another. Thus, there are cases in which it is not possible to convey the photosensitive material A straight.

Here, in the image recording device relating to the present fourth embodiment which can properly convey photosensitive materials which are conveyed on a conveying path of a multi-row conveying system, a distributing means for appropriately distributing the photosensitive materials A on the conveying path R, is provided so that the photosensitive materials A can be conveyed while maintaining the balance of the nipping force at the time the photosensitive material A is nipped between the pair of rollers for conveying 53, 55.

In order to maintain the balance of the nipping force at the time when the photosensitive material A is nipped between the pair of rollers for conveying 53, 55 at the conveying roller pair 52, for example, it suffices for the photosensitive material A to be disposed so as to be substantially symmetrical with respect to the central portion (a point) in the rotational axial direction (the longitudinal direction) of the pair of rollers for conveying 53, 55. When the central portion (a point) in the rotational axial direction (the longitudinal direction) of the pair of rollers for conveying 53, 55 substantially coincides with a central line S of the conveying direction at the conveying path R of the multi-row conveying system, it suffices to dispose the photosensitive material A to be symmetrical with respect to the central line S.

Figure 14:
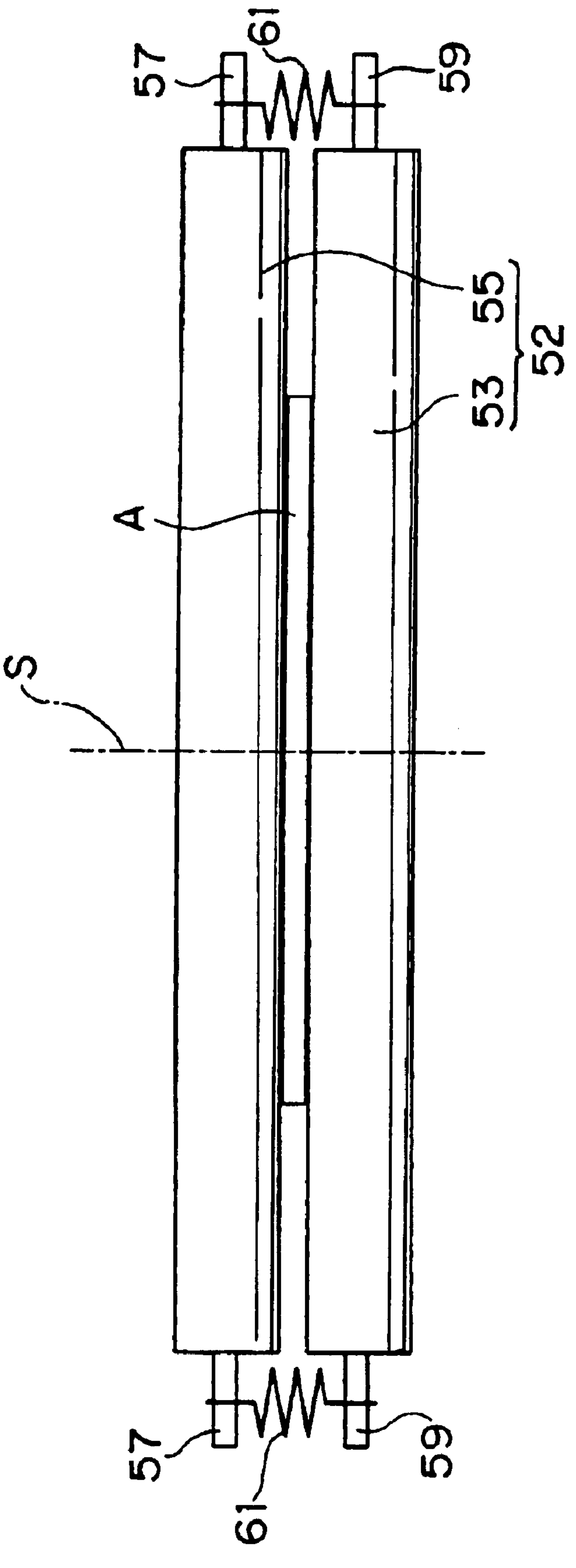
FIG. 14 is a schematic front view showing a state in which one photosensitive material is nipped by the conveying roller pair disposed on the conveying path of the multi-row conveying system relating to the fourth embodiment of the present invention.

For example, when one photosensitive material A is disposed on the conveying path R of the multi-row conveying system, as shown in FIG. 14, the central portion (a line) of the photosensitive material A in a direction (the widthwise direction) orthogonal to the conveying direction coincides with the rotational axial direction central portion (a point) of the pair of rollers for conveying 53, 55, such that the photosensitive material A is disposed symmetrically with respect to the central portion (a point) of the pair of rollers for conveying 53, 55. Or, the central portion (a line) of the photosensitive material A may coincide with the central line S of the conveying direction of the conveying path R of the multi-row conveying system, such that the photosensitive material A is disposed so as to be symmetrical with respect to the central line S.

Figure 12:
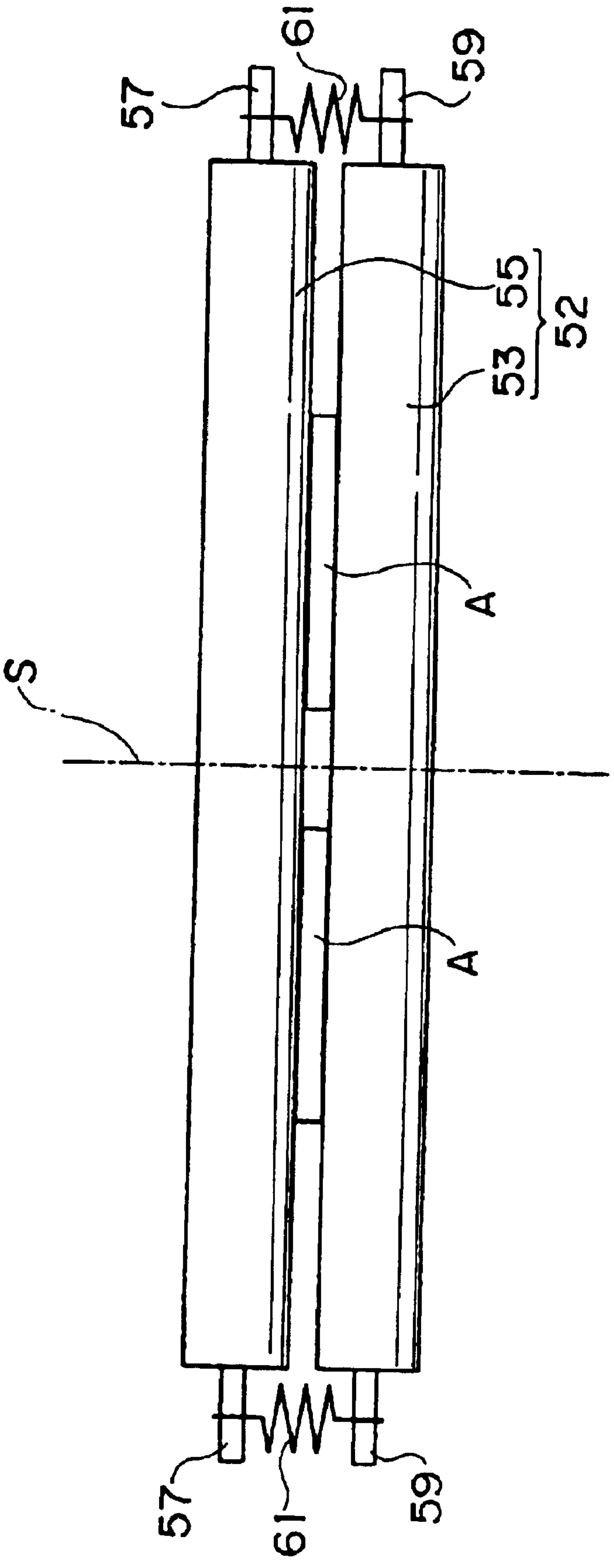
FIG. 12 is a schematic front view showing a state in which two photosensitive materials are nipped by a conveying roller pair disposed on the conveying path of the multi-row conveying system relating to the fourth embodiment of the present invention.

Moreover, when two (an even number of) photosensitive materials A are disposed on the conveying path R of the multi-row conveying system, as shown in FIG. 12, the two (even number of) photosensitive materials A may be disposed at positions which are symmetrical with respect to the central portion of the rotational axial direction of the pair of rollers for conveying 53, 55. Or, the photosensitive materials A may be disposed at positions which are symmetrical with respect to the central line S of the conveying direction at the conveying path R of the multi-row conveying system.

Figure 13:
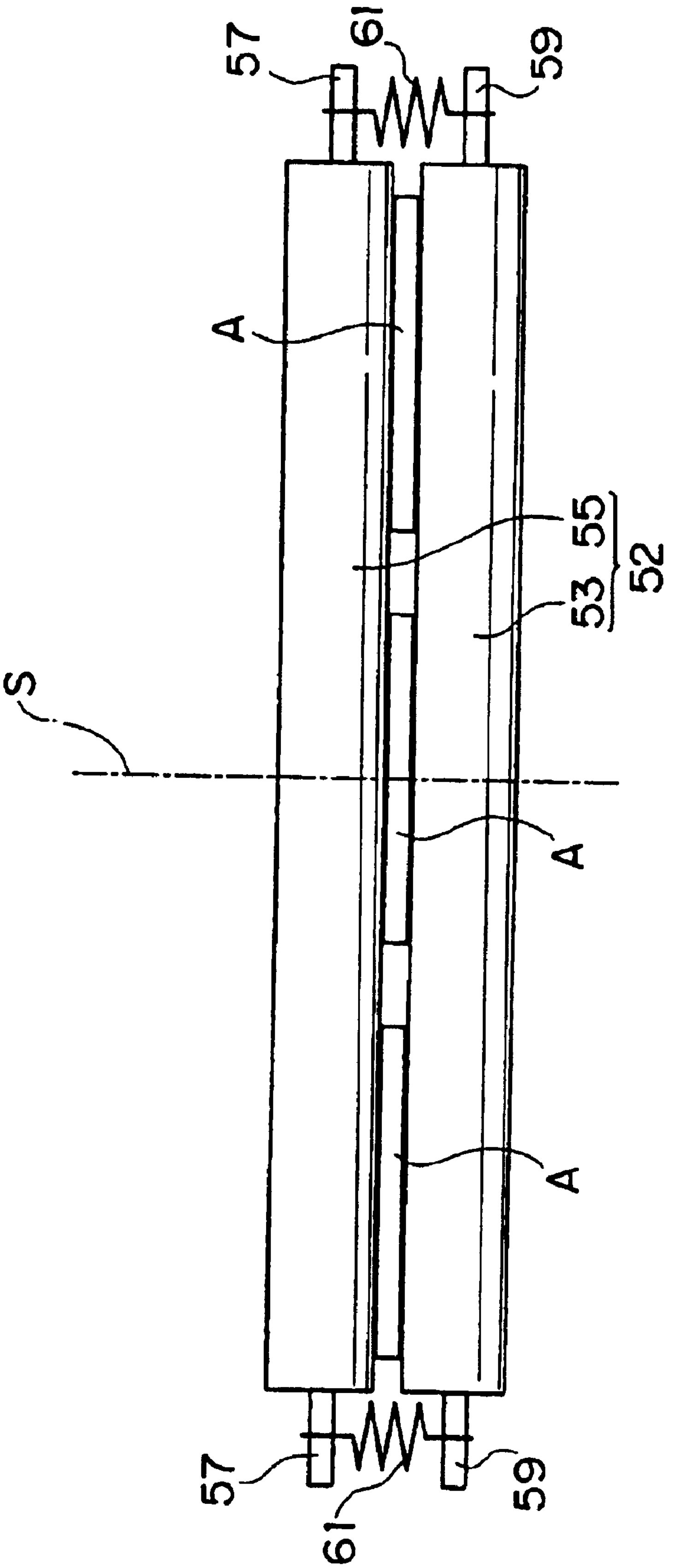
FIG. 13 is a schematic front view showing a state in which three photosensitive materials are nipped by the conveying roller pair disposed on the conveying path of the multi-row conveying system relating to the fourth embodiment of the present invention.

Moreover, when three (an odd number of three or more) photosensitive materials A are disposed on the conveying path R of the multi-row conveying system, as shown in FIG. 13, the central portion, in the direction orthogonal to the conveying direction, of the photosensitive material A which corresponds to the center among the three (the odd number of three or more) photosensitive materials A, coincides with and is symmetrical with respect to the central portion of the rotational axial direction of the pair of rollers for conveying 53, 55. Or, the central portion of this central photosensitive material A is disposed so as to coincide with the central line S of the conveying direction at the conveying path R of the multi-row conveying system, and so as to be symmetrical with respect to the central line S. Moreover, the photosensitive materials A other than the central photosensitive material A may be disposed so as to be symmetrical with respect to the central portion of the rotational axial direction of the pair of rollers for conveying 53, 55, or may be disposed so as to be symmetrical to the central line S of the conveying direction of the conveying path R of the multi-row conveying system.

Further, in order to maintain the balance of the nipping force at the time when the photosensitive material A is nipped between the pair of rollers for conveying 53, 55, it suffices for the photosensitive material A to be disposed on the conveying path R such that the respective rotational axes of the pair of rollers for conveying 53, 55 are parallel.

Here, the photosensitive materials A may be disposed at respective positions, which are offset toward the both side portions in the conveying direction on the conveying path R of the multi-row conveying system, and at which a balance can be achieved such that the rotational axes of the pair of rollers for conveying 53, 55 are parallel.

In this way, when photosensitive materials A of substantially the same size ("same size" or "substantially the same size" relating to the fourth embodiment means that lengths in the print conveyance direction are essentially equal. Length in the width direction may be different or length in the conveyance direction may include permissible errors in production) are disposed at predetermined positions offset toward the both conveying direction side portions of the conveying path R in a state in which the leading end sides and the trailing end sides of the photosensitive materials A coincide (or substantially coincide within the range of permissible errors) with respect to the conveying direction, the photosensitive materials A can be properly conveyed on a straight line, even if the photosensitive materials A are somewhat offset from positions symmetrical with respect to the central portion in the rotational axial direction of the pair of rollers 53, 55. Moreover, in this case, the other photosensitive materials A, which are disposed between the photosensitive materials A which are disposed at the predetermined positions offset toward the both conveying direction side portions of the conveying path R, can be conveyed properly on a straight line even if they are somewhat offset and not disposed symmetrically with respect to the central line S of the conveying direction of the conveying path R of the multi-row conveying system.

Next, the conditions enabling proper, rectilinear conveying of a single or plural photosensitive materials A while maintaining a balance of nipping force in a case in which the single or plural photosensitive materials A are conveyed on the conveying path R of the multi-row conveying system, will be described with reference to FIG. 15.

Figure 15:
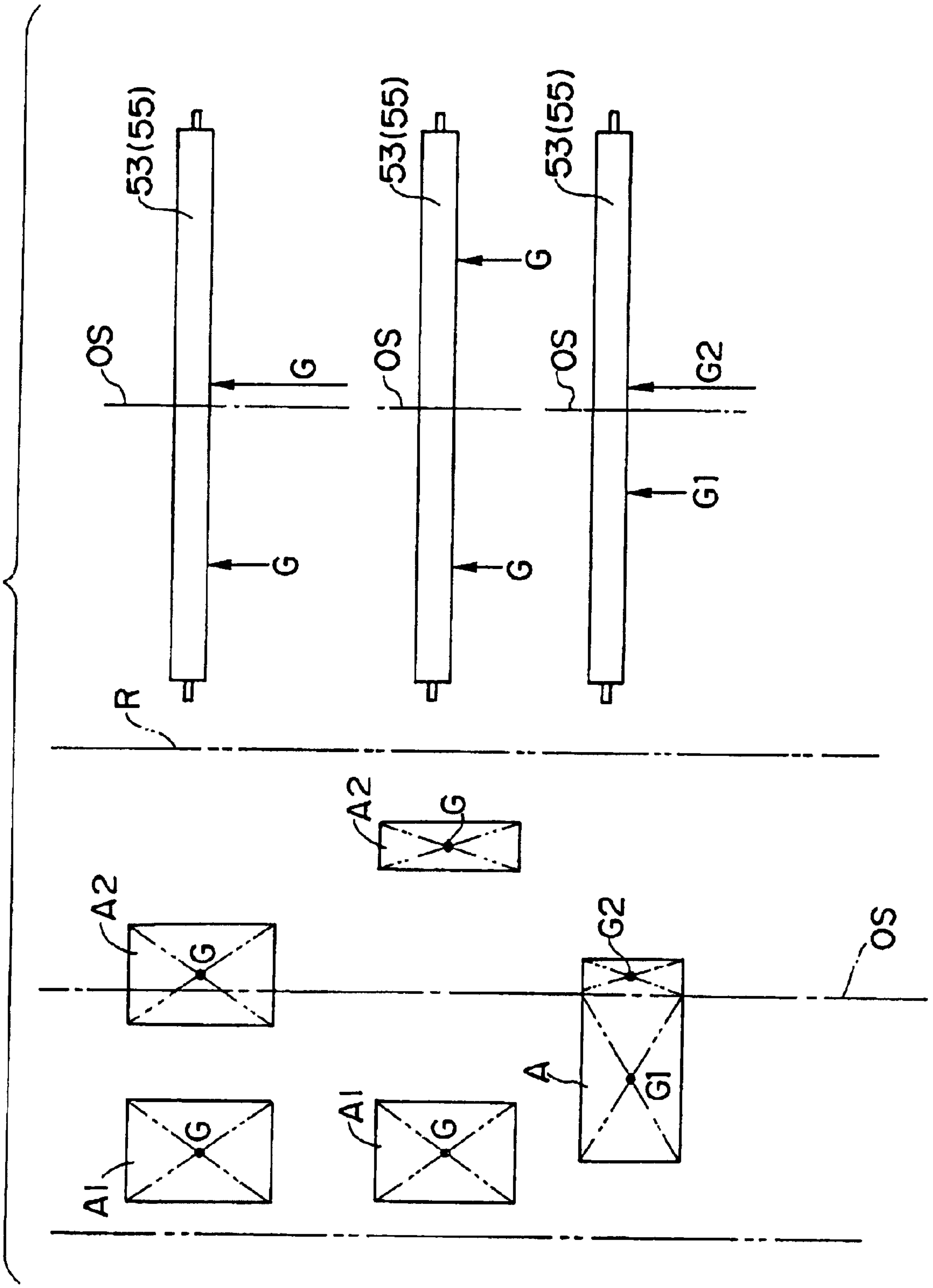
FIG. 15 is a diagram showing the relative positional relationships between photosensitive material sheets and the conveying roller pair at which proper conveying is possible, in a case in which a single or plural photosensitive materials are conveyed on the conveying path of the multi-row conveying system relating to the fourth embodiment of the present invention.

When a plurality of photosensitive materials A1, A2 are conveyed on the conveying path R shown in FIG. 15, at the conveying path R, the photosensitive materials A1, A2 are disposed such that a center of gravity G of at least the one photosensitive material A1 is positioned at one area (the left side area in the figure), and a center of gravity G of at least the one other photosensitive material A2 is positioned at the other area (the right side area in the figure), with the border being a central line OS which extends in the conveying direction and which passes through the central portion (a point) in the longitudinal direction (the rotational axial direction) of the conveying roller pair 52 (the pair of rollers for conveying 53, 55). In this case, for example, a portion of the photosensitive materials A1, A2 may be disposed on the central line OS.

The reason for this is as follows: when the reaction forces applied from the photosensitive materials A1, A2 approximate forces concentrating at the centers of gravity G, reaction forces from the respective centers of gravity G are applied to the one side and to the other side of the central line OS. These reaction forces are in equilibrium, and work to cancel the moment which rotates each roller for conveying 53 (55) around the central line OS. Therefore, the balance of the nipping force can be maintained, and the photosensitive materials A1, A2 can properly be conveyed rectilinearly.

In this case, for the same reason as described above, at the conveying path R, the size (surface area) of the photosensitive material A1 disposed at the one area and the photosensitive material A2 disposed at the other area may be different (see FIG. 15), under the condition that the respective conveying direction leading end sides and the respective conveying direction trailing end sides of the photosensitive material A1 disposed at the one area with respect to the central line OS and the photosensitive material A2 disposed at the other area coincide with respect to the conveying direction.

Namely, if the plurality of photosensitive material having equal length in the conveyance direction (the photosensitive material may include permissible errors from a time of cutting and forming the photosensitive material into the predetermined length in the conveyance direction, and the lengths of the photosensitive material in the width direction may be different) are conveyed such that each leading edge region and each trailing edge region coincide with each other with respect to the conveyance direction, balance of the nipping force can be maintained, and the photosensitive material A can be conveyed correctly and in a straight line.

As shown in FIG. 15, when a single photosensitive material A is conveyed on the conveying path R, at the conveying path R, the photosensitive material A is disposed in a state of being disposed on the central line OS which extends in the conveying direction and passes through the central portion in the longitudinal direction of the conveying roller pair 52 (the pair of rollers for conveying 53, 55) (i.e., passes through the central point with respect to the entire length in the rotational axial direction of the conveying roller pair 52 (the pair of rollers for conveying 53, 55)). Namely, the photosensitive material A is disposed such that at least a portion of the photosensitive material A travels on the central line OS.

When a single photosensitive material A is disposed on the conveying path R in this way, the reaction forces can be approximated to be applied from a center of gravity G1 of the portion of the photosensitive material A which is disposed within one area at one side of the central line OS, and a center of gravity G2 of the portion of the photosensitive material A which is disposed within the other area at the other side of the central line OS. The reaction forces are applied to the one side and the other side, respectively, of the central line OS (the central point) of each roller for conveying 53 (55). These reaction forces are in equilibrium, and work to cancel the moment which moves each roller for conveying 53 (55) around the central line OS. Thus, the balance of the nipping force can be maintained, and the photosensitive material A can properly be conveyed rectilinearly.

Next, explanation will be given of the distributing means for appropriately placing the single or plural photosensitive materials A on the conveying path R so that a balance of nipping force is maintained at the conveying roller pair, in the image recording device which relates to the present fourth embodiment and which conveys photosensitive materials in a multi-row conveying system.

The distributing means is structured by the previously-described distributing mechanism of the image recording device, and a control section which is provided at the image recording device for controlling the distributing mechanism. The distributing means may be structured so as to appropriately dispose a single or plural photosensitive materials A on the conveying path R, by the distributing mechanism being controlled by the control section on the basis of image information inputted to the image recording device.

In the distributing mechanism, the respective sizes (print sizes) of a necessary number of the photosensitive materials A, which are successively fed out onto the conveying path R from the magazine 16, are judged in order by the control section.

Then, when prints of substantially the same size (print size) are successive in the order of processing, control is carried out such that the photosensitive material A, which is of a size corresponding to a predetermined number of photosensitive materials A which can be lined up in the direction (the widthwise direction) orthogonal to the conveying direction of the conveying path R of the multi-row conveying system, is pulled out from the magazine 16 and is cut into the photosensitive materials A of substantially the same size (print size) by the cutter 42.

Further, control is carried out such that a predetermined number of the photosensitive materials A of substantially the same size are distributed and disposed on the conveying path R by the distributing mechanism 50, so as to be symmetrical with respect to the central portion of the rotational axial direction of the pair of rollers 53, 55, or so as to be symmetrical with respect to the central line S in the conveying direction of the conveying path R of the multi-row conveying system.

When it is not possible to ready the predetermined number of photosensitive materials A of substantially the same size, a single or plural photosensitive materials A of a number corresponding to the insufficient number is cut, and feeding control is carried out such that the single or plural photosensitive materials A are disposed on the conveying path R so as to be symmetrical with respect to the central portion of the rotational axial direction of the pair of rollers 53, 55, or are disposed so as to be symmetrical with respect to the central line S of the conveying direction at the conveying path R of the multi-row conveying system.

Any type of feeding control may be carried out provided that the distributing means has a structure which places a single or plural photosensitive materials A in a state suited to the conditions for enabling proper, rectilinear conveying while maintaining the balance of the nipping force in a case in which a single or plural photosensitive materials A are conveyed on the conveying path R of a multi-row conveying system.

For example, when a plurality of the photosensitive materials A are conveyed on the conveying path R, the distributing means may carry out control to dispose the photosensitive materials A such that the center of gravity G of at least one photosensitive material A is positioned in one area with respect to the central line OS, and the center of gravity G of at least one other photosensitive material A is positioned in the other area. In this case, a portion of the photosensitive material A may be disposed on the central line OS.

Moreover, when a single photosensitive material A is conveyed on the conveying path R for example, the distributing means may dispose the photosensitive material A in a state of being disposed on the central line OS.

Figure 16:
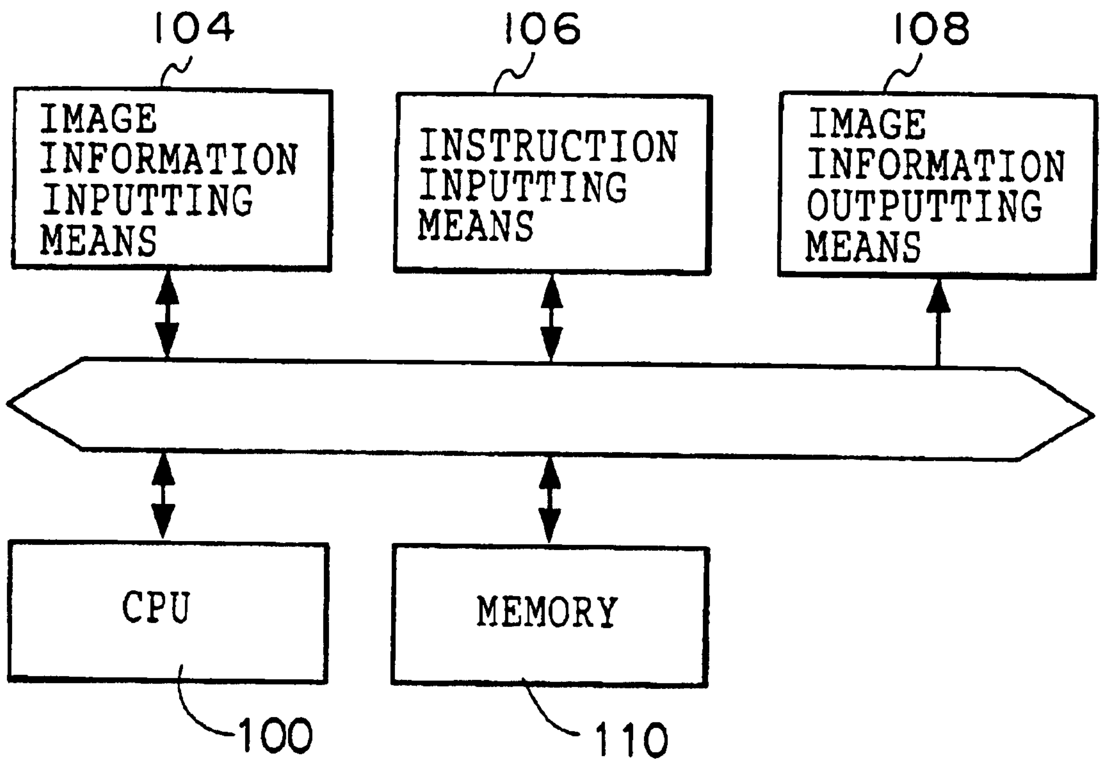
FIG. 16 is a block diagram showing an example of a controlling means for changing the order of image processing so that conveyance of photosensitive material sheets of equal size along the conveyance path of the multi-row conveyance system relating to the fourth embodiment of the present invention is successive.
Figure 17:
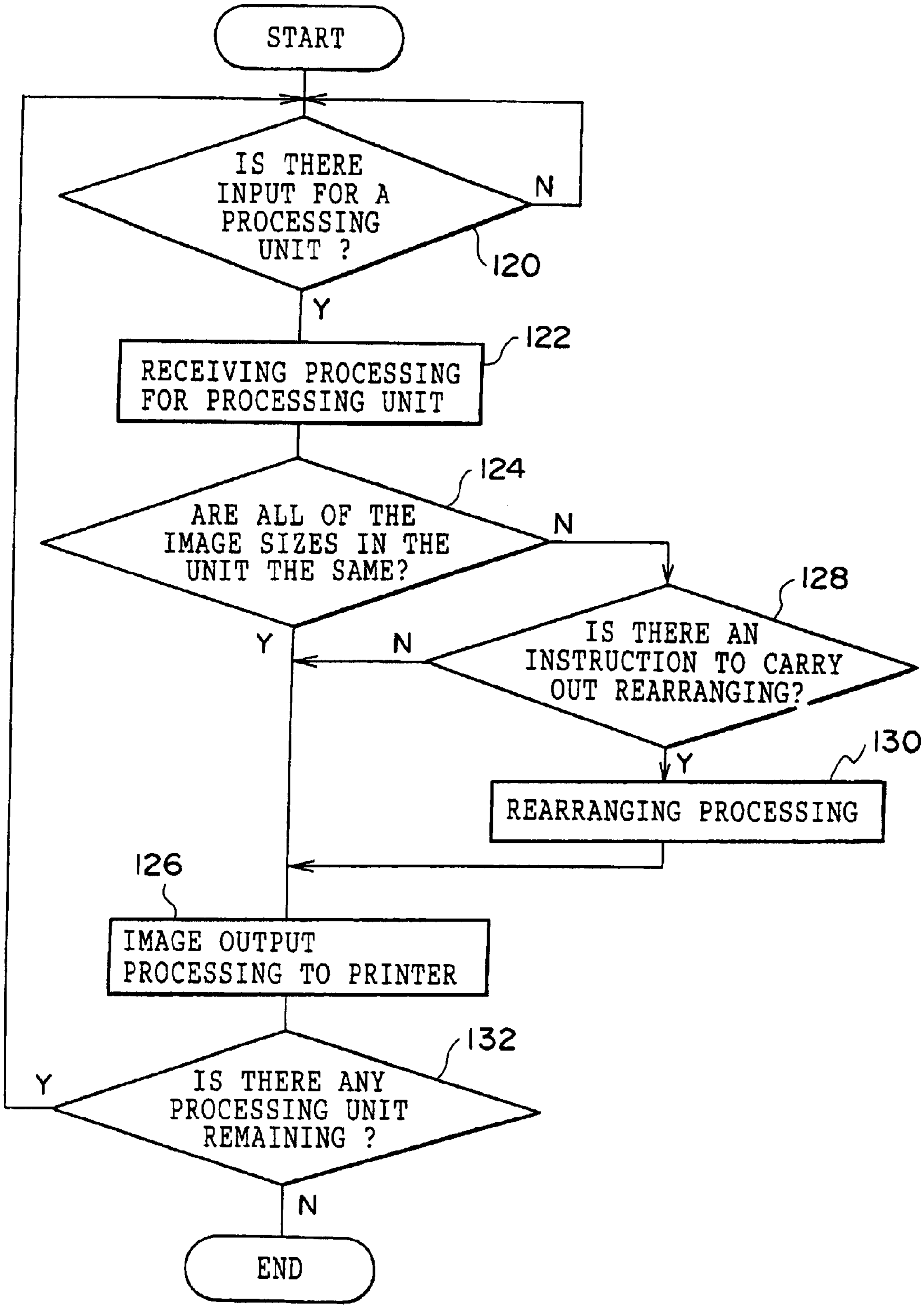
FIG. 17 is a flowchart showing an example of the control procedures executed by the controlling means for changing the order of image processing so that conveyance of photosensitive material sheets of equal size along the conveyance path of the multi-row conveyance system relating to the fourth embodiment of the present invention is successive.
Figure 18:
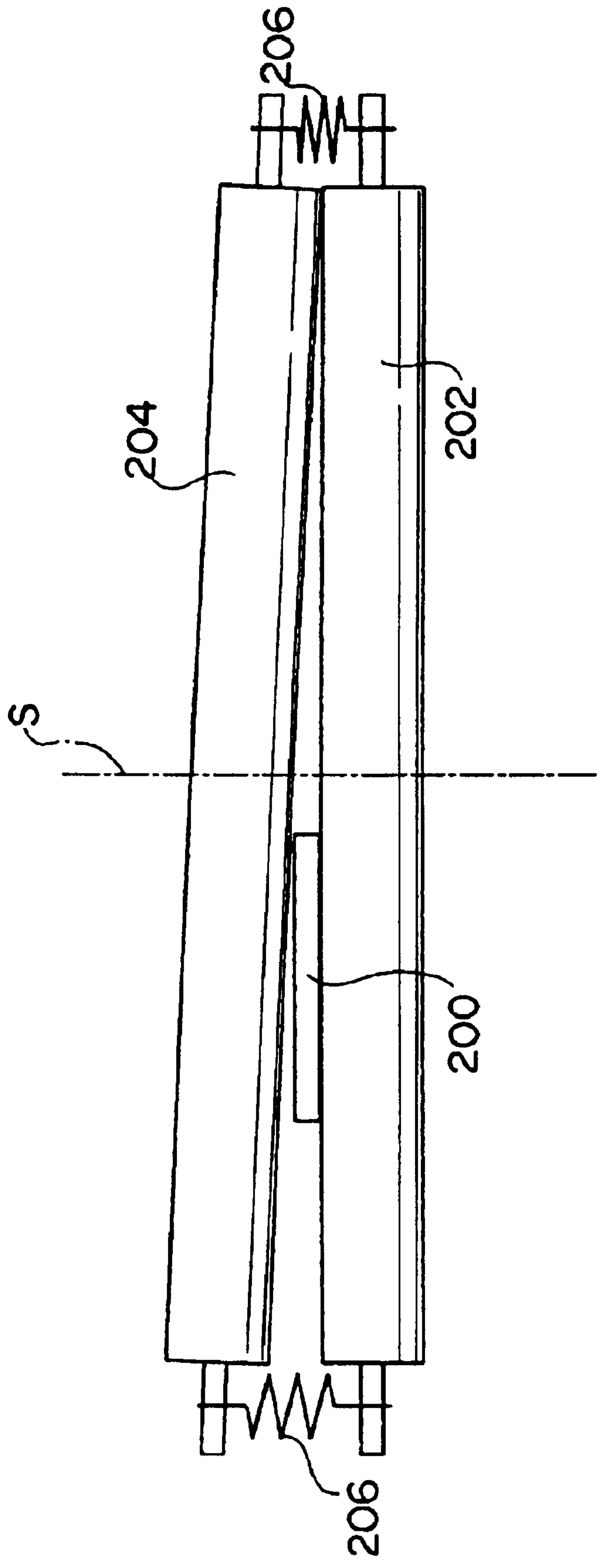
FIG. 18 is a schematic front view showing a state in which a photosensitive material is nipped at a position offset toward one side of conveying rollers, at a conventional conveying roller pair set on a conveying path.

Next, an example of the processing order controlling means which, when the photosensitive materials A are scan-exposed at the image recording device such that latent images are formed, carries out control for changing the order of processing such that substantially the same size photosensitive materials A are successive in a case in which substantially the same sizes (print sizes) exist intermittently in accordance with the processing order (i.e., in a case in which different sizes are mixed together), will be described with reference to FIGS. 16 and 17.

The processing order controlling means is structured, for example, as per the block diagram of FIG. 16. The processing order controlling means has a central processing device 100 which governs control (and which has a CPU and has an unillustrated ROM in which various types of programs and the like are stored in advance).

The central processing device 100 is connected to a main bus 102. The central processing device 100 is connected, via the main bus 102, to a memory 110 which stores image data.

The central processing device 100 is connected, via the main bus 102, to an image information inputting means 104 which fetches image data from a film on which images recorded and from a memory (a medium which stores image data photographed by a digital camera). The image information inputting means 104 fetches the image data by using either one set of images photographed on one film or one set of images photographed by one digital camera, as a group of image data which will be processed as one processing unit.

In this way, the central processing device 100 has the functions of transferring the image data, which is inputted from the image information inputting means 104, to the memory 110 via the main bus 102, and appropriately reading the image data and storing the image data.

The central processing device 100 is connected to an instruction inputting means 106 via the main bus 102. The instruction inputting means 106 is structured such that a user can input, by a keyboard or the like, command information for designating the print sizes of the respective image data.

The central processing device 100 has the functions of transferring the print size command information, which is inputted from the instruction inputting means 106, to the memory 110, and appropriately reading the command information and storing the command information.

The central processing device 100 is connected to an image information outputting means 108 via the main bus 102. The image information outputting means 108 is structured so as to be able to output, to the printer 12, the respective image data stored in the memory 110 as well as the print size command information.

The central processing device 100 has the function of carrying out processing to change the order of the printing processing of the set of the image data read from the memory 110 and the print size command information corresponding thereto, such that the same print sizes are successive in each group of image data of one processing unit of one film, or each group of image data of one processing unit photographed by one digital camera, i.e., such that the same print sizes are successive in each processing unit.

The central processing device 100 has the function of readably storing in the memory 110 the image data of one processing unit (a group of image data) whose printing processing order has been changed.

Moreover, the central processing device 100 has the function of outputting the group of image data, whose printing processing order has been changed such that the same print sizes are successive, to the printer 12 of the image recording device by the image information outputting means 108.

When the printer 12 scan-exposes the photosensitive materials A and forms latent images, there are cases in which printing processing of substantially the same size (print size) photosensitive materials A is not successive, and processing for substantially the same size photosensitive materials A is intermittent. In this case, the procedures of controlling the processing order, which are executed in accordance with a program stored in the central processing device 100 in order to change the order of processing such that there is successive processing of photosensitive materials A of substantially the same size which are in a group which is to be processed collectively (e.g., which are in one processing unit which is formed from images relating to a series of objects in one film) and in order to narrow the interval between the photosensitive materials A such that as large of a number of photosensitive materials A as possible can be efficiently disposed on the conveying path R, will be described in accordance with the flowchart of FIG. 17.

First, in the processes of the flowchart, in step 120, the routine stands-by until image data is inputted at the image information inputting means 104 and command information is inputted at the instruction inputting means 106. When the image data has been inputted and the command information has been inputted, the routine moves on to step 122.

In step 122, the image data, which is fetched from the image information inputting means 104, is made into a group for each processing unit. Namely, for images recorded on a film, a series of image data which should be grouped together within the one film are collected together and made to be a group. Or, a series of image data which should be grouped together and which have been photographed by one digital camera are collected together from the memory (a medium storing image data photographed by the digital camera) and made to be a group. Further, the print size command information, which is inputted from the instruction inputting means 106 and corresponds to the respective image data which have been grouped together into one processing unit, is integrated with the corresponding image data information. The integrated information is transferred to and stored in the memory 110, and the routine moves on to step 124.

In step 124, a determination is made as to whether the image data information, which are in one processing unit being currently processed and whose print sizes have been designated, are all the same image size or not. If they are all the same image size, the routine moves on to step 126. If different image sizes are included therein, the routine moves on to step 128.

In step 128, a judgement is made as to whether a selection has been made, by the user from the instruction inputting means 106, to carry out exposure processing at the printer 12 after the processing order has been changed at the processing order controlling means such that substantially the same size photosensitive materials A are successive. If the user has opted to not change the processing order, the routine moves on to step 126, whereas if the user has selected changing of the processing order, the routine moves on to step 130.

In the processing executed in step 130 for changing the processing order such that photosensitive materials A of substantially the same size are successive, for example, the central processing device 100 rearranges the order of reading from the memory 110 and processing one group of image data information whose print sizes have been designated, to an order starting from the smallest image size. Then, the one group of image data information, whose print sizes have been designated and whose processing order has been rearranged, is overwritten and stored in the memory 110. (Note that the original data may be retained in the memory 110 as well.)

Namely, in the processing for rearranging the order to start from the smallest image size, the respective image data, which have been designated as the smallest print size among the one processing unit of image data information whose print sizes have been designated, are read and arranged in order from the start of the image data information of the one processing group. Next, after the set of the respective image data which have been designated as the smallest print size, the respective image data, which have been designated as the second smallest print size, are read and arranged in order from the start of the image data information of the one processing group. Then, after the set of the respective image data which have been designated as the second smallest print size, the respective image data, which have been designated as the third smallest print size, are read and arranged in order from the start of the image data information of the one processing group.

Then, by repeating the above-described operation, the respective image data, which have been designated as the largest print size, are read and arranged in order from the start of the image data information of the one processing group, and thereafter, processing is completed.

The image data information of the one processing unit, which has been subjected to the processing for rearranging the order so as to start from the smallest image size in this way, are arranged from the start in the order of image data information of the set of the smallest print size, image data information of the set of the second smallest print size, image data information of the set of the third smallest print size, and finally, the image data information of the largest print size are arranged.

In the processing carried out in step 130 for changing the order of processing such that the photosensitive materials A of substantially the same size are successive, the photosensitive materials A of the same print size may be grouped together in sets. Moreover, groups of the photosensitive material A of substantially the same size may be arranged in an arbitrary print size order with this processing.

Next, in step 126, the object of processing at the printer 12, which is either one processing unit of image data information whose print sizes have been designated and whose processing order has been rearranged or is one processing unit of image data information as is whose print sizes have been designated, is read from the memory 110, and is transferred to the input side of the image recording device 10 for printing processing, and the routine moves on to step 132.

In step 132, whether a processing unit of image data information whose print sizes have been designated, which processing unit has been inputted but has not been print processed, remains in the memory 110 is detected. When it is determined that a processing unit of image data information whose print sizes have been designated, which processing unit has not been print processed, remains in the memory 110, the process returns to step 120 and the processing is continued. When it is determined that a processing unit of image data information whose print sizes have been designated, which processing unit has not been print processed, does not remain in the memory 110, the process finishes.

In a case in which, for example, printing processing of substantially the same size photosensitive materials A is intermittent and printing processing of substantially the same size (print size) photosensitive materials A is not successive in accordance with the processing order, the plurality of photosensitive materials A cannot efficiently be disposed so as to be packed in closely on the conveying path R of the multi-type conveying system. Thus, as described above, in the image recording device which relates to the present fourth embodiment and which conveys photosensitive materials in a multi-row conveying system, control is carried out by the processing order controlling means to appropriately change the processing order such that, within one processing unit (a group which is to be processed collectively, e.g., images of one film or the like), substantially the same sized photosensitive materials A are processed successively.

In the image recording device, in a case in which control is carried out to pull the photosensitive material A out from the magazine 16 and cut the photosensitive material A into photosensitive materials A of substantially the same size (print size) at the cutter 42, and a predetermined number of substantially the same sized photosensitive materials A are conveyed on the conveying path R by the distributing mechanism 50, at the conveying path R, the photosensitive materials A are disposed such that the center of gravity G of at least one photosensitive material A is positioned within one area, and the center of gravity G of at least one other photosensitive material A is positioned within another area, with respect to the central line OS at the conveying roller pair 52 (the pair of rollers for conveying 53, 55). (Note that it suffices to have at least one conveying roller pair 52 on the conveying path.)

Moreover, when a single photosensitive material A is conveyed on the conveying path R, at the conveying path R, feeding control is carried out so as to dispose the photosensitive material A in a state in which at least a portion of the photosensitive material A travels on the central line OS at the conveying roller pair 52.

In this way, in the image recording device 10, when a plurality of photosensitive materials A of different print sizes are successively subjected to image forming processing, cases in which a predetermined number of photosensitive materials A cannot simultaneously be conveyed on the conveying path because their print sizes are different can be kept to a minimum. The opportunities to simultaneously process the predetermined number of photosensitive materials A are increased. The plural photosensitive materials A can be processed efficiently, the speed of the processing can be improved, and the productivity can be improved.

Note that structures of the present fourth embodiment other than those described above, as well as operations and effects based thereon, are the same as those of the above-described first embodiment. Therefore, description thereof will be omitted.

Further, the image recording device of the present invention is not limited to the above-described embodiments, and various other structures can be employed within a scope which does not deviate from the gist of the present invention.

In the image recording device relating to the present invention, photosensitive materials can be distributed into plural rows by a simple structure.

In addition, the image recording device relating to the present invention has the effect of being able to properly convey photosensitive materials which are conveyed on a conveying path of a multi-row conveying system.

What is claimed is:

1. An image recording device for exposing a photosensitive material, which is being conveyed, and recording an image on the photosensitive material, said image recording device comprising:

a housing for housing the photosensitive material;

a conveying path of the photosensitive material, which includes an intersection region, extends in a first direction towards the intersection region, and at the intersection region, further extends in a second direction, which intersects the first direction;

a first conveying mechanism for pulling the photosensitive material out from the housing, conveying the photosensitive material in the first direction along the conveying path, and positioning at least one photosensitive material sheet at the intersection region; and a second conveying mechanism for conveying the at least one photosensitive material sheet, which is at the intersection region, from the intersection region in the second direction along the conveying path, wherein the first conveying mechanism positions an edge of one photosensitive material sheet at one of different positions over the intersection region according to at least one of a size of the one photosensitive material or a number of photosensitive material sheets, and a leading edge of the at least one photosensitive material sheet when conveyed in the first direction is substantially parallel to the second direction.

2. The image recording device of claim 1, wherein the photosensitive material, which is housed in the housing, is an elongated photosensitive material that is wound up, the first conveying mechanism includes a cutting tool for cutting the photosensitive material, which has been pulled out from the housing, and making the photosensitive material into at least one photosensitive material sheet having a desired length.

3. The image recording device of claim 2, wherein the first conveying mechanism positions a plurality of photosensitive recording sheets, which have been cut, at different positions over the intersection region.

4. The image recording device of claim 3, wherein the cutting tool is disposed upstream, with respect to the first direction, of the intersection region, and successively carries out a cutting operation while the photosensitive material is being conveyed by the first conveying mechanism.

5. The image recording device of claim 3, wherein a plurality of cutting tools are disposed at the intersection region, and cut the photosensitive material after the photosensitive material reaches the intersection region.

6. The image recording device of claim 1, further comprising a guide for positioning, with respect to the second conveying direction, the at least one photosensitive material sheet conveyed to the intersection region.

7. The image recording device of claim 1, wherein the second direction is substantially orthogonal to the first direction.

8. The image recording device of claim 6, wherein the second direction is a vertical direction, the guide includes a substantially horizontal surface, and a trailing end edges, with respect to the second direction, of the at least one photosensitive material sheet abuts said surface of the guide and is positioned with respect to the second direction.

9. The image recording device of claim 1, wherein the first conveying mechanism includes a plurality of roller pairs at the intersection region, and each roller pair can nip the photosensitive material therebetween and conveys the photosensitive material.

10. The image recording device of claim 9, wherein respective rollers of each roller pair are able to be separated from and contacted with one another, and when a positioning operation with respect to the second direction is carried out, the respective rollers of each roller pair are moved apart from one another.

11. The image recording device of claim 1, wherein the first conveying mechanism includes at least one belt pair at the intersection region, the at least one belt pair for nipping and conveying the photosensitive material.

12. The image recording device of claim 11, wherein respective belts of the belt pair are able to be separated from and contacted with one another, and when a positioning operation with respect to the second direction is carried out, the respective belts of the belt pair are separated from one another.

13. The image recording device of claim 4, wherein the first conveying mechanism includes at least one belt pair at the intersection region, the at least one bell pair for nipping and conveying the photosensitive material.

14. The image recording device of claim 13, further comprising, at the intersection region, guide pins which can enter onto and withdraw from the conveying path, wherein the guide pins project onto the conveying path, and abut leading end edges, with respect to the first direction, of the photosensitive material sheets, and position the photosensitive material sheets with respect to the first direction.

15. The image recording device of claim 1, wherein the second conveying mechanism includes, at the intersection region, at least one roller pair which conveys the at least one photosensitive material sheet, and the respective rollers of the at least one roller pair are able to be separated from and contacted with one another, and when a positioning operation is carried out, the respective rollers of the at least one roller pair are separated from one another.

16. The image recording device of claim 1, wherein the at least one photosensitive material sheet conveyed by the second conveying mechanism is exposed simultaneously for image formation.

17. The image recording device of claim 1, wherein the photosensitive material is pulled-out from the housing with a surface of the photosensitive material being substantially horizontal.

18. The image recording device of claim 1, wherein the first conveying mechanism includes, between the intersection region and the housing, a roller pair which nips and conveys the photosensitive material, and one roller of the roller pair comprises, at an outer peripheral surface thereof, a blade extending along an axial direction of the one roller, and the other roller of the roller pair comprises, at an outer peripheral surface thereof, a groove extending along an axial direction of the other roller, and when the roller pair rotates and the blade enters into and is received by the groove, the photosensitive material, which is nipped between the blade and the groove, is cut.

19. The image recording device of claim 1, further comprising a position controller for controlling the positioning carried out by the first conveying mechanism, wherein the second conveying mechanism includes at least one pair of rollers, which are substantially orthogonal to the second direction and comprise peripheral surfaces of predetermined widths, and in a case in which plural sheets, which have substantially equal lengths relative to the second conveying direction, are nipped and conveyed in parallel by the at least one pair of rollers, the position controller positions the sheets such that a center of gravity of at least one sheet is positioned at one side and a center of gravity of at least one other sheet is positioned at another side, with respect to a line, which extends in the second direction and passes through a substantially central portion of a widthwise direction of the at least one pair of rollers.

20. The image recording device of claim 1, further comprising a position controller for controlling the positioning carried out by the first conveying mechanism, wherein the second conveying mechanism includes at least one pair of rollers, which are substantially orthogonal to the second direction and have peripheral surfaces of predetermined widths, and in a case in which only a single sheet is conveyed by the at least one pair of rollers, the position controller positions the sheet such that one portion of the sheet travels on a line, which extends in the second direction and passes through a substantially central portion of a widthwise direction of the at leas one pair of rollers.

21. The image recording device of claim 1, further comprising:

a memory device for storing image data of images, which are to be recorded on photosensitive materials and belong to one group, and storing designated size information for the respective images; and an order controller for controlling an order of processing for image recording, wherein, on the basis of the size information, the order controller determines an order of image recording within the group such that processing of images of substantially the same size is executed in succession.

22. An image recording device for exposing a photosensitive material, which is being conveyed, and recording an image on the photosensitive material, said image recording device comprising:

a housing for housing sheets of the photosensitive material;

a conveying path of the photosensitive material, which includes an intersection region, extends in a first direction towards the intersection region, and at the intersection region, further extends in a second direction, which intersects the first direction;

a first conveying mechanism for pulling the sheets of the photosensitive material out from the housing, conveying the sheets in the first direction along the conveying path, and positioning the sheets at respectively different conveying positions at the intersection region; and a second conveying mechanism for conveying the sheets of the photosensitive material, which are at the intersection region, from the intersection region and in the second direction along the conveying path.

23. The image recording device of claim 22, wherein the housing houses the sheets of the photosensitive material, which have been cut in advance to predetermined lengths.

24. The image recording device of claim 22, wherein leading edges of the sheets of the photosensitive material when conveyed in the first direction is substantially parallel to the second direction.

* * * * *